United States Patent
Lee et al.

(10) Patent No.: US 10,976,871 B2
(45) Date of Patent: Apr. 13, 2021

(54) TOUCH DISPLAY DEVICE AND PANEL INCLUDING MESH TYPE ELECTRODES

(71) Applicant: LG DISPLAY CO., LTD., Seoul (KR)

(72) Inventors: Yangsik Lee, Paju-si (KR); JiHyun Jung, Paju-si (KR); SuChang An, Seoul (KR); JaeGyun Lee, Paju-si (KR)

(73) Assignee: LG DISPLAY CO., LTD., Seoul (KR)

( * ) Notice: Subject to any disclaimer, the term of this patent is extended or adjusted under 35 U.S.C. 154(b) by 0 days.

(21) Appl. No.: 16/173,842

(22) Filed: Oct. 29, 2018

(65) Prior Publication Data
US 2019/0146608 A1 May 16, 2019

(30) Foreign Application Priority Data
Nov. 16, 2017 (KR) .................. 10-2017-0152815

(51) Int. Cl.
*G06F 3/041* (2006.01)
*G06F 3/044* (2006.01)

(52) U.S. Cl.
CPC ............ *G06F 3/044* (2013.01); *G06F 3/0416* (2013.01); *G06F 3/0412* (2013.01); *G06F 3/0418* (2013.01); *G06F 3/0443* (2019.05); *G06F 3/0446* (2019.05); *G06F 3/0448* (2019.05); *G06F 2203/04112* (2013.01)

(58) Field of Classification Search
CPC ...... G06F 3/044; G06F 3/0416; G06F 3/0448; G06F 3/0443; G06F 3/0446; G06F 3/0418; G06F 3/0412
See application file for complete search history.

(56) References Cited

U.S. PATENT DOCUMENTS

| 2008/0277259 | A1 | 11/2008 | Chang | |
|---|---|---|---|---|
| 2010/0045614 | A1* | 2/2010 | Gray | G06F 3/044 345/173 |
| 2010/0302201 | A1* | 12/2010 | Ritter | G06F 3/044 345/174 |
| 2014/0111711 | A1* | 4/2014 | Iwami | G06F 3/044 349/12 |
| 2014/0332256 | A1* | 11/2014 | Cok | G06F 3/0446 174/253 |
| 2015/0062457 | A1* | 3/2015 | Kida | G06F 3/044 349/12 |

(Continued)

FOREIGN PATENT DOCUMENTS

| EP | 3410278 A1 | 12/2018 |
|---|---|---|
| JP | 2013-152619 A | 8/2013 |

(Continued)

*Primary Examiner* — Adam J Snyder
(74) *Attorney, Agent, or Firm* — Birch, Stewart, Kolasch & Birch, LLP

(57) ABSTRACT

A touch display device can include a touch panel including a plurality of touch electrodes including a first touch electrode and a second touch electrode, the first touch electrode being adjacent to and electrically isolated from the second touch electrode; and a touch-sensing circuit configured to drive the touch panel and sense a touch or touch coordinates, in which an outline portion of the first touch electrode and an outline portion of the second touch electrode have different shapes within a boundary area between the first touch electrode and the second touch electrode.

9 Claims, 22 Drawing Sheets

(56) References Cited

U.S. PATENT DOCUMENTS

| | | | | |
|---|---|---|---|---|
| 2015/0109245 | A1* | 4/2015 | Chou | G06F 3/044 |
| | | | | 345/174 |
| 2015/0346866 | A1* | 12/2015 | Kusunoki | G06F 3/044 |
| | | | | 345/174 |
| 2016/0011713 | A1* | 1/2016 | Kida | G06F 3/044 |
| | | | | 345/174 |
| 2016/0195983 | A1* | 7/2016 | Miyake | G06F 3/044 |
| | | | | 345/174 |
| 2017/0336907 | A1* | 11/2017 | Jeong | G06F 3/044 |
| 2018/0033832 | A1* | 2/2018 | Park | G06F 1/1652 |
| 2019/0087027 | A1* | 3/2019 | Shim | G06F 3/041 |

FOREIGN PATENT DOCUMENTS

| | | |
|---|---|---|
| KR | 10-2013-0021588 A | 3/2013 |
| TW | 201319900 A1 | 5/2013 |

\* cited by examiner

TOUCH DISPLAY DEVICE AND PANEL INCLUDING MESH TYPE ELECTRODES

CROSS REFERENCE TO RELATED APPLICATION

This application claims priority from Korean Patent Application No. 10-2017-0152815, filed in the Republic of Korea on Nov. 16, 2017, the entirety of which is hereby incorporated by reference for all purposes as if fully set forth herein.

BACKGROUND OF THE INVENTION

1. Field of the Invention

The present disclosure relates to a touch display device and a panel.

2. Description of the Background Art

As society develops further into an information society, there is increasing demand for display devices having various forms for displaying images. In recent years, various display devices such as a liquid crystal display device, a plasma display device, and an organic light-emitting diode display device have been utilized.

Such display devices include a touch display device capable of providing a touch-based input scheme that enables a user to easily input information or a command intuitively and conveniently, while avoiding conventional input schemes, such as a button, a keyboard, and a mouse.

In order for the touch display device to provide such a touch-based input scheme, it is necessary to determine the presence or absence of a user's touch, and to correctly detect touch coordinates.

For this purpose, among various types of touch-sensing schemes, a capacitance-based touch-sensing scheme has been widely used for detecting the presence or absence of a touch, touch coordinates, or the like based on a change in capacitance formed at a plurality of touch electrodes disposed on a touch.

In the capacitance-based touch-sensing scheme, the touch sensitivity can be improved only when capacitance or the magnitude of change thereof between the touch electrodes is formed to a large extent depending on the presence or absence of a touch.

However, when a signal or voltage unrelated to touch sensing flows into the touch electrodes, it acts as noise during the touch driving, and thus a small capacitance component between the touch electrodes is detected, which may cause the touch sensitivity to greatly deteriorate.

SUMMARY OF THE INVENTION

In view of the foregoing, an aspect of embodiments disclosed herein is to provide a touch display device and a panel that enable accurate and noise-robust touch sensing.

Another aspect of embodiments disclosed herein is to provide a touch display device and a panel having a touch electrode outline structure that enables accurate and noise-robust touch sensing.

Still another aspect of embodiments disclosed herein is to provide a touch display device and a panel that have a touch electrode outline structure which is capable of obtaining a large sensing value corresponding to a mutual capacitance component.

Yet another aspect of embodiments disclosed herein is to provide a touch display device and a panel that enable accurate and noise-robust touch sensing even in a structure having a slim design.

In an aspect, embodiments of the present disclosure can provide a touch panel on which a plurality of touch electrodes is arranged and a touch-sensing circuit configured to sense the touch panel and to the detect the presence or absence of a touch or touch coordinates.

In the touch panel, among the plurality of touch electrodes, adjacent first and second touch electrodes can be electrically separated from each other.

In the touch panel, in a boundary area between the first touch electrode and the second touch electrode, an outline portion of the first touch electrode and an outline portion of the second touch electrode can have different shapes.

As an example, only one of the outline portion of the first touch electrode and the outline portion of the second touch electrode may have at least one protrusion.

As another example, at least one protrusion existing in the outline portion of the first touch electrode and at least one protrusion existing in the outline portion of the second touch electrode can have different sizes.

As another example, at least one protrusion existing in the outline portion of the first touch electrode can protrude into an area occupied by the outline portion of the second touch electrode.

As another example, at least one protrusion existing in the outline portion of the first touch electrode can protrude into a space between two or more protrusions existing in the outline portion of the second touch electrode.

In another aspect, embodiments of the present disclosure can provide a panel in which a plurality of touch electrodes and a plurality of touch lines electrically connected to the plurality of touch electrodes are disposed.

In this panel, among the plurality of touch electrodes, adjacent first and second touch electrodes can be electrically separated from each other.

In the boundary area between the first touch electrode and the second touch electrode, the outline portion of the first touch electrode and the outline portion of the second touch electrode can have different shapes.

As an example, only one of the outline portion of the first touch electrode and the outline portion of the second touch electrode may have at least one protrusion.

As another example, at least one protrusion existing in the outline portion of the first touch electrode and at least one protrusion existing in the outline portion of the second touch electrode can have different sizes.

As another example, at least one protrusion existing in the outline portion of the first touch electrode can protrude into an area occupied by the outline portion of the second touch electrode.

As another example, at least one protrusion existing in the outline portion of the first touch electrode can protrude into a space between two or more protrusions existing in the outline portion of the second touch electrode.

In another aspect, embodiments of the present disclosure can provide a panel in which a plurality of touch electrodes and a plurality of touch lines electrically connected to the plurality of touch electrodes are disposed.

In this panel, among the plurality of touch electrodes, adjacent first and second touch electrodes can be electrically separated from each other.

In view of the embodiments described above, it is possible to provide a touch display device and a panel that enable accurate and noise-robust touch sensing.

According to the embodiments, it is possible to provide a touch display device and a panel having a touch electrode outline structure that enable accurate and noise-robust touch sensing.

According to the embodiments, it is possible to provide a touch display device and a panel that have a touch electrode outline structure which is capable of obtaining a large sensing value corresponding to a mutual capacitance component.

According to the embodiments, it is possible to provide a touch display device and a panel that enable accurate and noise-robust touch sensing even in a structure having a slim design.

BRIEF DESCRIPTION OF THE DRAWINGS

The above and other aspects, features and advantages of the present disclosure will be more apparent from the following detailed description taken in conjunction with the accompanying drawings, in which.

DETAILED DESCRIPTION OF THE EMBODIMENTS

Figure 1:
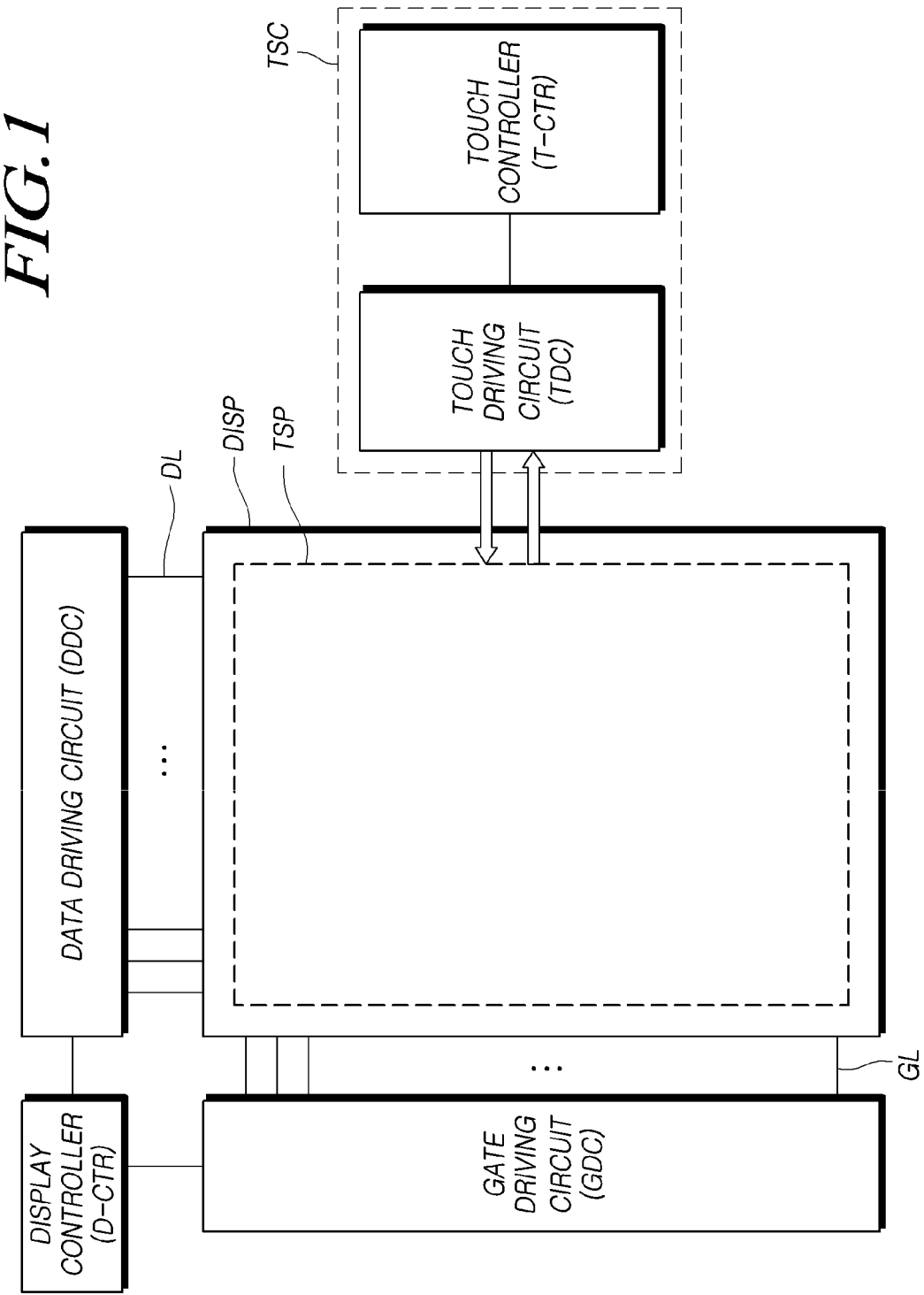
FIG. 1 is a system configuration diagram of a touch display device according to embodiments of the present disclosure.

Hereinafter, some embodiments of the present disclosure will be described in detail with reference to the accompanying illustrative drawings. In designating elements of the drawings by reference numerals, the same elements will be designated by the same reference numerals although they are shown in different drawings. Further, in the following description of the present disclosure, a detailed description of known functions and configurations incorporated herein will be omitted when it may make the subject matter of the present disclosure rather unclear.

In addition, terms, such as first, second, A, B, (a), (b) or the like may be used herein when describing components of the present disclosure. Each of these terminologies is not used to define an essence, order or sequence of a corresponding component but used merely to distinguish the corresponding component from other component(s). In the situation that it is described that a certain structural element "is connected to," "is coupled to," or "is in contact with" another structural element, it should be interpreted that another structural element may "be connected to," "be coupled to," or "be in contact with" the structural elements as well as that the certain structural element is directly connected to or is in direct contact with another structural element.

FIG. 1 is a system configuration diagram of a touch display device according to embodiments of the present disclosure.

Referring to FIG. 1, a touch display device according to embodiments of the present disclosure can provide an image display function for displaying images and a touch-sensing function for sensing a user's touch.

The touch display device according to embodiments of the present disclosure can include a display panel DISP in which data lines and gate lines are arranged, a display-driving circuit configured to drive the display panel DISP, and the like, for image display.

The display-driving circuit can include a data driving circuit DDC configured to drive data lines, a gate driving circuit GDC configured to drive gate lines, a display controller D-CTR configured to control the gate driving circuit, and the like.

The touch display device according to embodiments of the present disclosure can include a touch panel TSP in which a plurality of touch electrodes TE is disposed as touch sensors for touch sensing, a touch-sensing circuit TSC configured to perform driving and sensing processing of the touch panel TSP, and the like.

The touch-sensing circuit TSC supplies a driving signal to the touch panel TSP in order to drive the touch panel TSP, detects a sensing signal from the touch panel TSP, and senses the presence or absence of a touch and/or a touch position (touch coordinates).

Such a touch-sensing circuit TSC may include a touch-driving circuit TDC configured to supply a driving signal to the touch panel TSP and to receive a sensing signal from the touch panel TSP, a touch controller T-CTR configured to determine the presence or absence of a touch and/or a touch position (touch coordinates), and the like.

The touch-sensing circuit TSC can be implemented with one or more components (e.g., integrated circuits), and can be implemented separately from the display-driving circuit.

In addition, the entirety or a part of the touch-sensing circuit TSC may be integrated with the display-driving circuit and one or more of the internal circuits. For example, the touch-driving circuit TDC of the touch-sensing circuit TSC can be implemented as an integrated circuit together with the data driving circuit DDC of the display-driving circuit.

In addition, the touch display device according to embodiments of the present disclosure is capable of sensing a touch based on the capacitance formed at the touch electrodes TE.

The touch display device according to embodiments of the present disclosure adopts a capacitance-based touch-sensing scheme, and is also capable of sensing a touch with a mutual-capacitance-based touch-sensing scheme. In some instances, the touch display device according to embodiments of the present disclosure may sense a touch using a self-capacitance-based touch-sensing scheme. Hereinafter, for the convenience of explanation, a situation where the touch display device according to embodiments of the present disclosure senses a touch using a mutual-capacitance based touch-sensing scheme will be described as an example.

Figure 2:
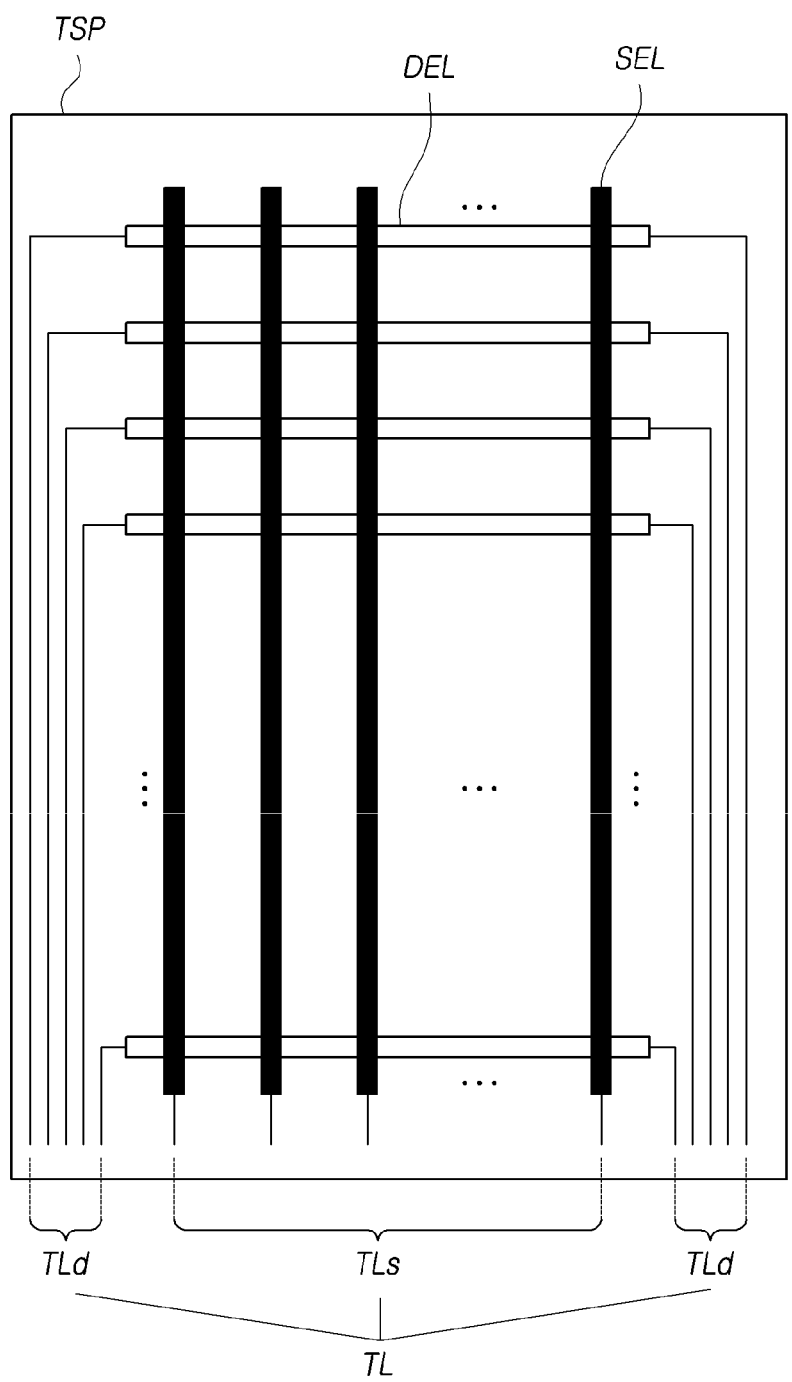
FIG. 2 is an example diagram of a touch panel in the touch display device according to embodiments of the present disclosure.
Figure 3:
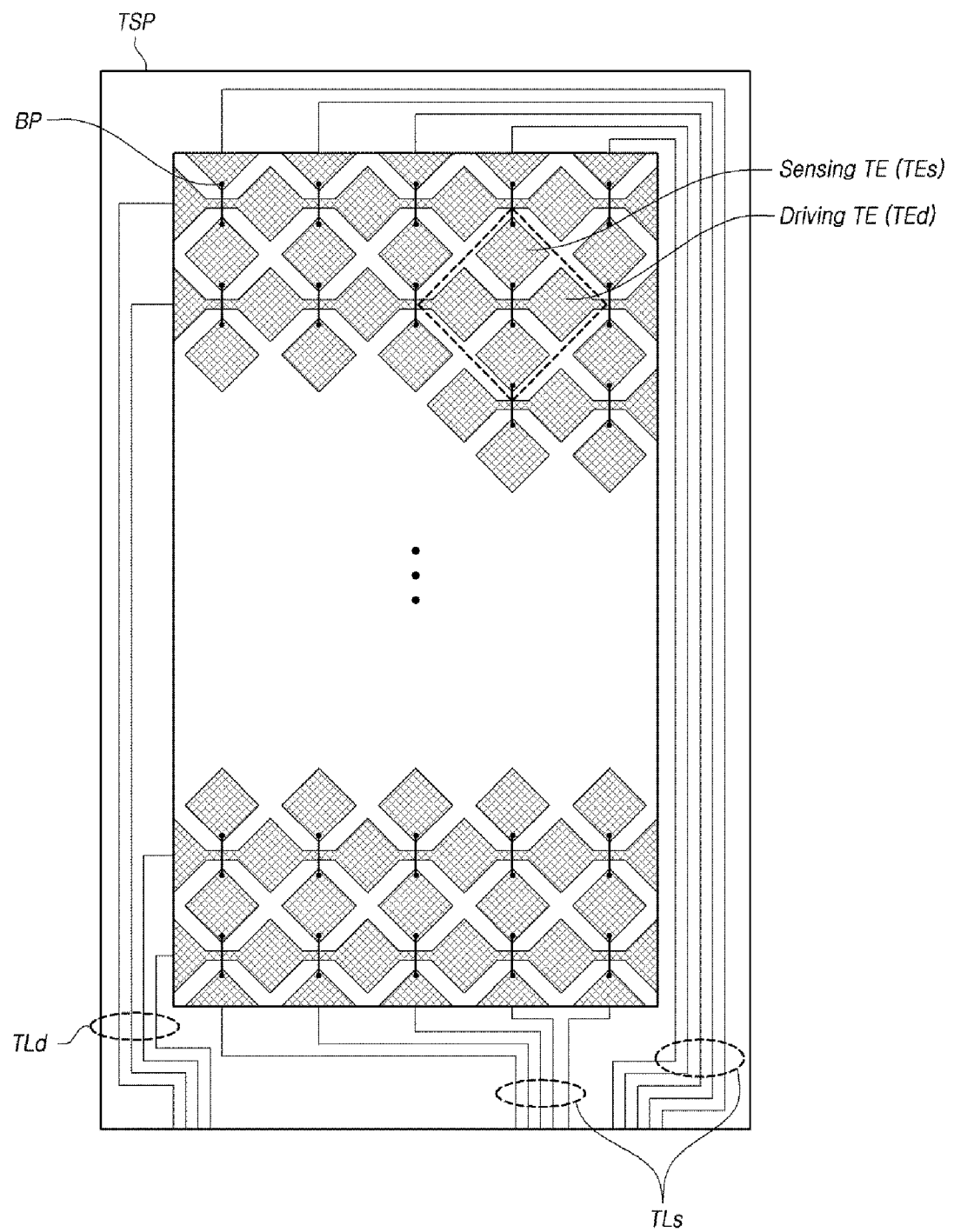
FIG. 3 is another example diagram of a touch panel in the touch display device according to embodiments of the present disclosure.

FIGS. 2 and 3 are example diagrams of a touch panel TSP when the touch display device according to embodiments of the present disclosure senses a touch using a mutual-capacitance-based touch-sensing scheme.

Referring to FIGS. 2 and 3, in the mutual-capacitance-based touch-sensing scheme, a plurality of touch electrodes TE arranged in the touch panel TSP may be classified into a driving touch electrode TEd (Driving TE) (also referred to as a driving electrode, a transmission electrode, or a drive line) to which a driving signal is applied, and a sensing touch electrode TEs (Sensing TE) (also referred to as a sensing electrode, a reception electrode, or a sensing line) from which a sensing signal is sensed and which forms a capacitance with the driving electrode.

Referring to FIGS. 2 and 3, the driving touch electrodes TEd disposed in the same row (or the same column) are electrically connected to each other by an integration method (or by a connection method using a bridge pattern) to form one driving touch electrode line DEL.

Referring to FIGS. 2 and 3, the sensing touch electrodes TEs disposed in the same column (or the same row) are electrically connected to each other by a bridge pattern BP (or by an integration method) to form one sensing touch electrode line SEL.

In the mutual-capacitance-based touch-sensing scheme, the touch-sensing circuit TSC applies a driving signal to one or more driving touch electrode lines DEL and receives a sensing signal from one or more sensing touch electrode lines SEL. Based on the received sensing signal, the presence or absence of a touch, touch coordinates, or the like is detected based on a change in capacitance (mutual-capacitance) between the driving touch electrode lines DEL and the sensing touch electrode lines SEL depending on the presence or absence of a pointer such as a finger or a pen.

Referring to FIGS. 2 and 3, for driving signal transmission and sensing signal transmission, each of the plurality of driving touch electrode lines DEL and the plurality of sensing touch electrode lines SEL is electrically connected to a touch-driving circuit TDC via one or more touch lines TL.

More specifically, for driving signal transmission, each of the plurality of driving touch electrode lines DEL is electrically connected to the touch-driving circuit TDC via one or more driving touch lines TLd. For sensing signal transmission, each of the plurality of sensing touch electrode lines SEL is electrically connected to the touch-driving circuit TDC via one or more sensing touch lines TLs.

In addition, in a touch display device according to embodiments of the present disclosure, a touch panel TSP can be of an externally attached type manufactured separately from a display panel DISP and bonded to the display panel DISP, or can be of a built-in type which is manufactured together with a display panel DISP and is present inside the display panel DISP.

In the touch display device according to embodiments of the present disclosure, when the touch panel TSP is of a built-in type in which the touch panel TSP exists inside the display panel DISP, the touch panel TSP may be an aggregate of a plurality of touch electrodes TE arranged in the display panel DISP, or may be the display panel DISP itself.

Hereinafter, for the convenience of explanation, it is assumed that the touch panel TSP is of a built-in type in which the touch panel TSP exists inside the display panel DISP. In this instance, the touch electrodes TE and the touch lines TL are electrodes and signal lines existing inside the display panel DISP.

In addition, the display panel DISP of the touch display device according to embodiments of the present disclosure may be any of various types such as an organic light-emitting diode panel (OLED panel) or a liquid crystal display (LCD panel). Hereinafter, for the convenience of explanation, an OLED panel will be described as an example.

Figure 4:
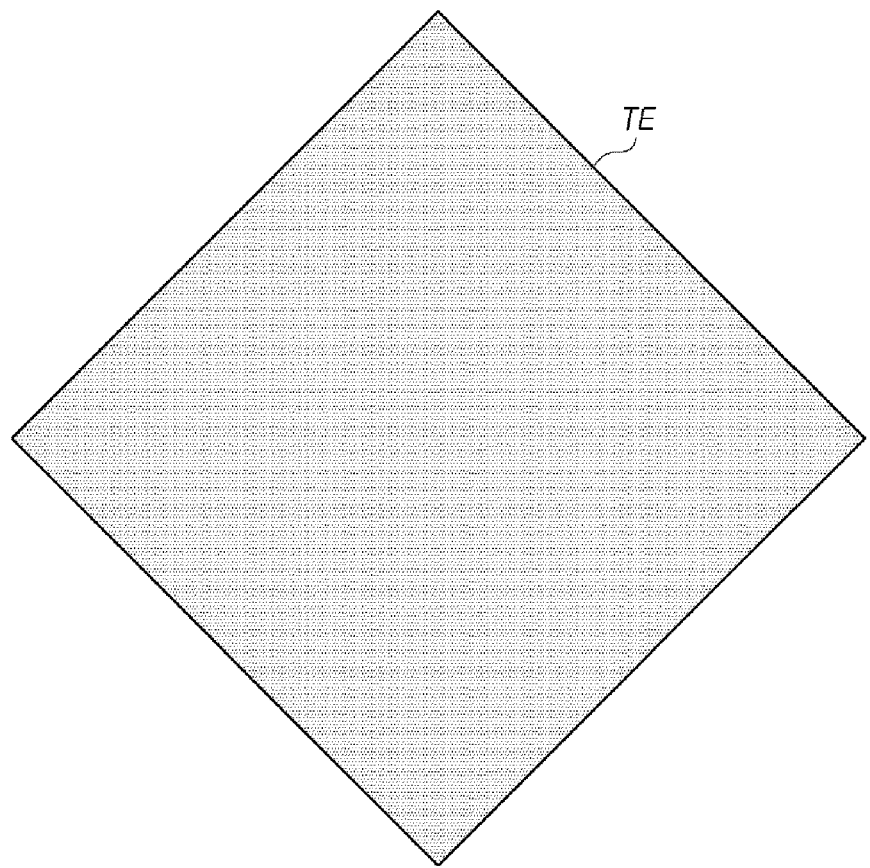
FIG. 4 is a diagram illustrating a non-mesh type touch electrode disposed on a touch panel in the touch display device according to embodiments of the present disclosure.

FIG. 4 is a diagram illustrating one non-mesh type touch electrode TE disposed on a touch panel TSP in the touch display device according to embodiments of the present disclosure.

Referring to FIG. 4, in the touch display device according to embodiments of the present disclosure, each of the plurality of touch electrodes TE disposed on the touch panel TSP can be of a non-mesh type.

The non-mesh type touch electrode TE can be a plate-shaped electrode metal having no open area (e.g., a solid metal plate).

In this instance, the touch electrode TE can be a transparent electrode. This is for the light emission efficiency of the display panel DISP.

Figure 5:
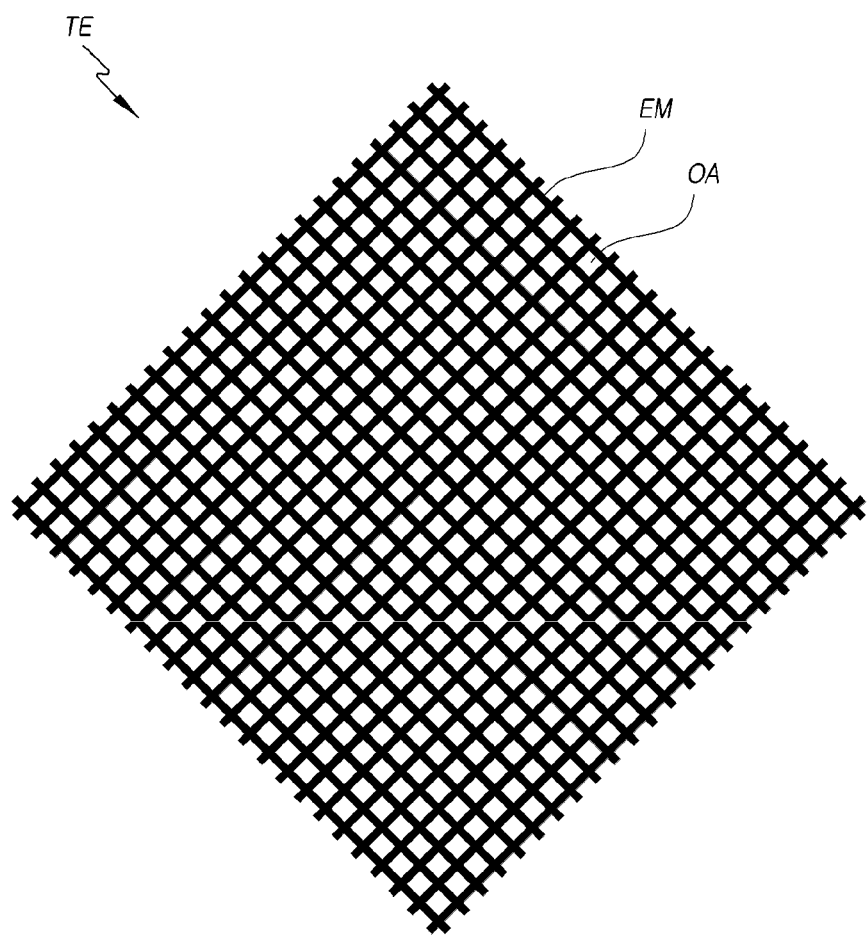
FIG. 5 is a diagram illustrating a mesh type touch electrode disposed on a touch panel in the touch display device according to embodiments of the present disclosure.

FIG. 5 is a diagram illustrating a mesh type touch electrode arranged in a touch panel TSP in the touch display device according to the embodiments of the present disclosure.

Referring to FIG. 5, in the touch display device according to embodiments of the present disclosure, each of the plurality of touch electrodes TE disposed on the touch panel TSP can be of a mesh type.

The mesh type touch electrode TE can be made of an electrode metal EM patterned in a mesh type (e.g., a net like pattern, or wire mesh).

Accordingly, a plurality of open areas OA can exist in the area of the mesh-type touch electrode TE (e.g., the mesh-type touch electrode can have a perforated type of structure or a net like structure).

Figure 6:
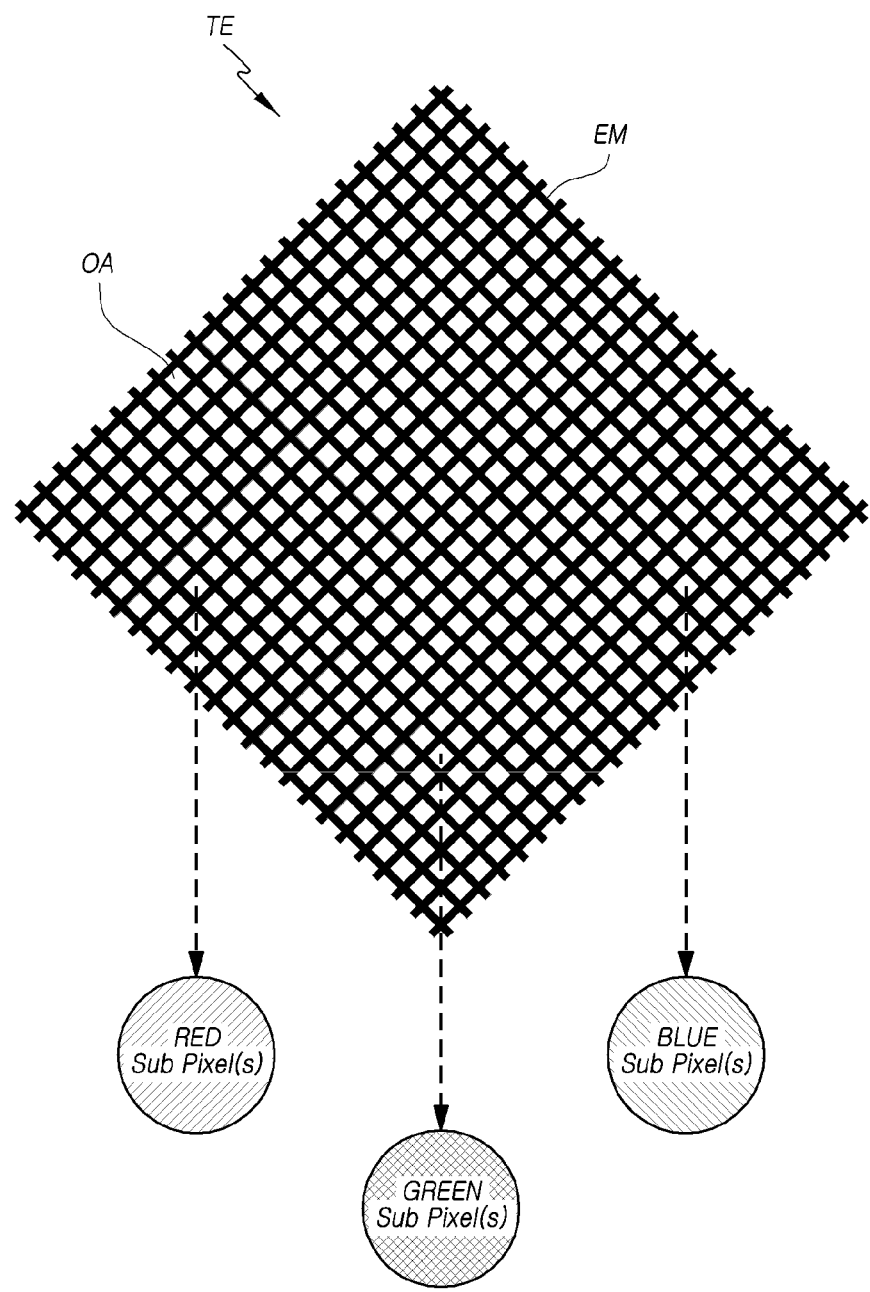
FIG. 6 is a diagram illustrating a relationship between one touch electrode and sub-pixels in the touch display device according to embodiments of the present disclosure.

FIG. 6 is a diagram illustrating a correspondence relationship between a mesh-type touch electrode TE and sub-pixels arranged on a touch panel TSP in the touch display device according to embodiments of the present disclosure.

Referring to FIG. 6, each of the plurality of open areas OA existing in an area of the touch electrode TE, which is an electrode metal EM patterned in a mesh type, can correspond to a light-emitting area of at least one sub-pixel (e.g., a center of each sub-pixel can be aligned with a center of a corresponding open area OA so the sub-pixels can shine through the mesh-type touch electrodes).

For example, each of the plurality of open areas OA existing in the area of one touch electrode TE can correspond to the light-emitting area of at least one of red, green, and blue sub-pixels.

In another example, each of the plurality of open areas OA existing in the area of one touch electrode TE can correspond to light-emitting area at least one of red, green, blue, and white sub-pixels.

As described above, since each touch electrode TE is an electrode metal EM patterned in a mesh type and the light-emitting area of at least one sub-pixel is correspondingly present in each of the open areas OA of each touch electrode TE in a plan view, it is possible to further increase the aperture ratio and light emission efficiency of a display panel DISP while enabling touch sensing.

As described above, the outline of one touch electrode TE can be approximately rhombic or rectangular (including square), for example, and an open area OA corresponding to a hole in one touch electrode TE may also be rhombic or rectangular (may include square), for example.

However, the shape of the touch electrode TE and the shape of the open area OA can be variously modified and designed in consideration of the shape of sub-pixels, the arrangement structure of the sub-pixels, touch sensitivity, and the like.

Figure 7:
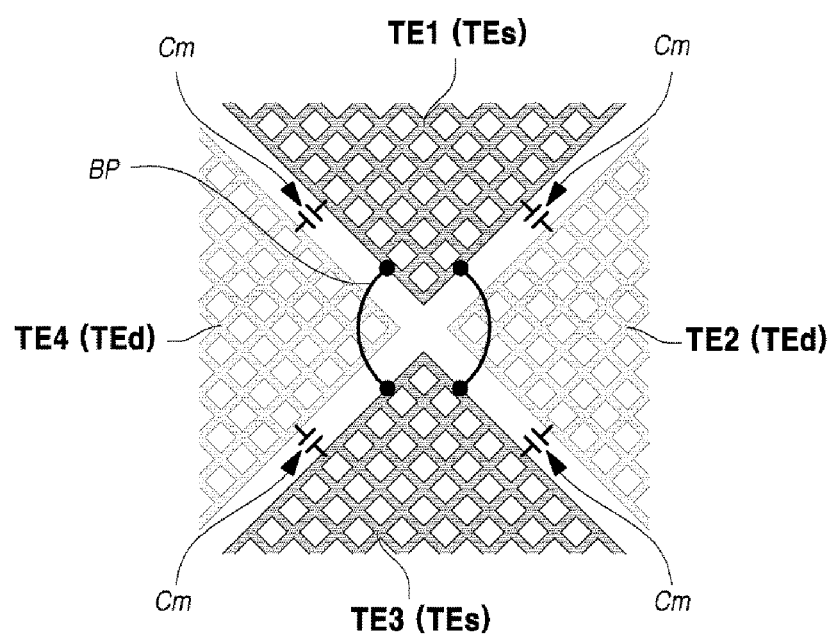
FIGS. 7 and 8 are diagrams illustrating mutual capacitances formed between driving touch electrodes TEd and sensing touch electrodes TEs in the touch display device according to embodiments of the present disclosure.
Figure 8:
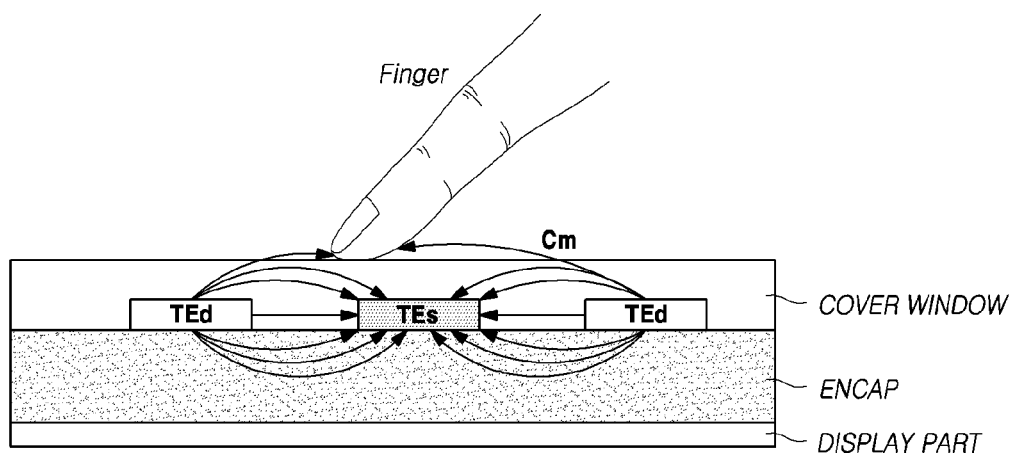

FIGS. 7 and 8 are diagrams illustrating mutual capacitances formed between driving touch electrodes TEd and sensing touch electrodes TEs in the touch display device according to embodiments of the present disclosure.

Referring to FIG. 7, under the touch panel TSP-based structure of FIG. 3, two driving touch electrodes TEd (TE2 and TE4) and two sensing touch electrodes TEs (TE1 and TE3) are disposed adjacent to each other in the touch panel TSP.

The two driving touch electrodes TEd (TE2 and TE4) are electrically connected by integration (or a bridge pattern), thereby forming one driving touch electrode line DEL.

The two sensing touch electrodes TEs (TE1 and TE3) are electrically connected to each other by a bridge pattern BP (or integration), thereby forming one sensing touch electrode line SEL.

The touch-sensing circuit TSC applies a driving signal to the two driving touch electrodes TEd (TE2 and TE4) during the touch-driving period and receives a sensing signal from the two sensing touch electrodes TEs (TE1 and TE3).

Referring to FIG. 8, based on sensing signals received from one sensing touch electrode TEs or two or more sensing touch electrodes TEs included in one sensing touch electrode line SEL, the touch-sensing circuit TSC may calculate mutual capacitance Cm or the magnitude of change Cm thereof between the driving touch electrode Ted and the sensing touch electrode TEs depending on the presence or absence of a touch and may accumulate the total mutual capacitance Cm or the change Cm thereof calculated in this way to determine the presence or absence of a touch or touch coordinates.

Also, FIG. 8 briefly illustrates a situation where a touch panel TSP is built into the display panel DISP as an example, in which an insulating layer is disposed on a display part, and touch electrodes TEd and TEs can be arranged on the insulating layer.

The display part can include electrodes or signal lines arranged on the display panel DISP in association with driving the display.

When the display panel DISP is an OLED panel, the insulating layer existing between the display part and the touch electrodes TEd and TEs can be, for example, an encapsulation layer ENCAP.

Figure 9:
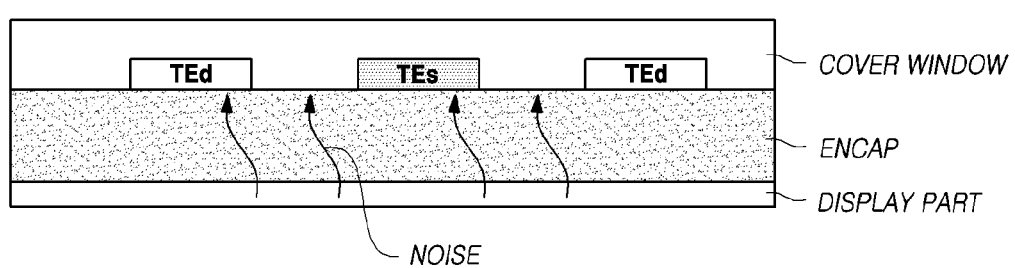
FIGS. 9 and 10 are views illustrating a phenomenon in which a touch malfunction occurs due to noise generated during touch driving in the touch display device according to embodiments of the present disclosure.
Figure 10:
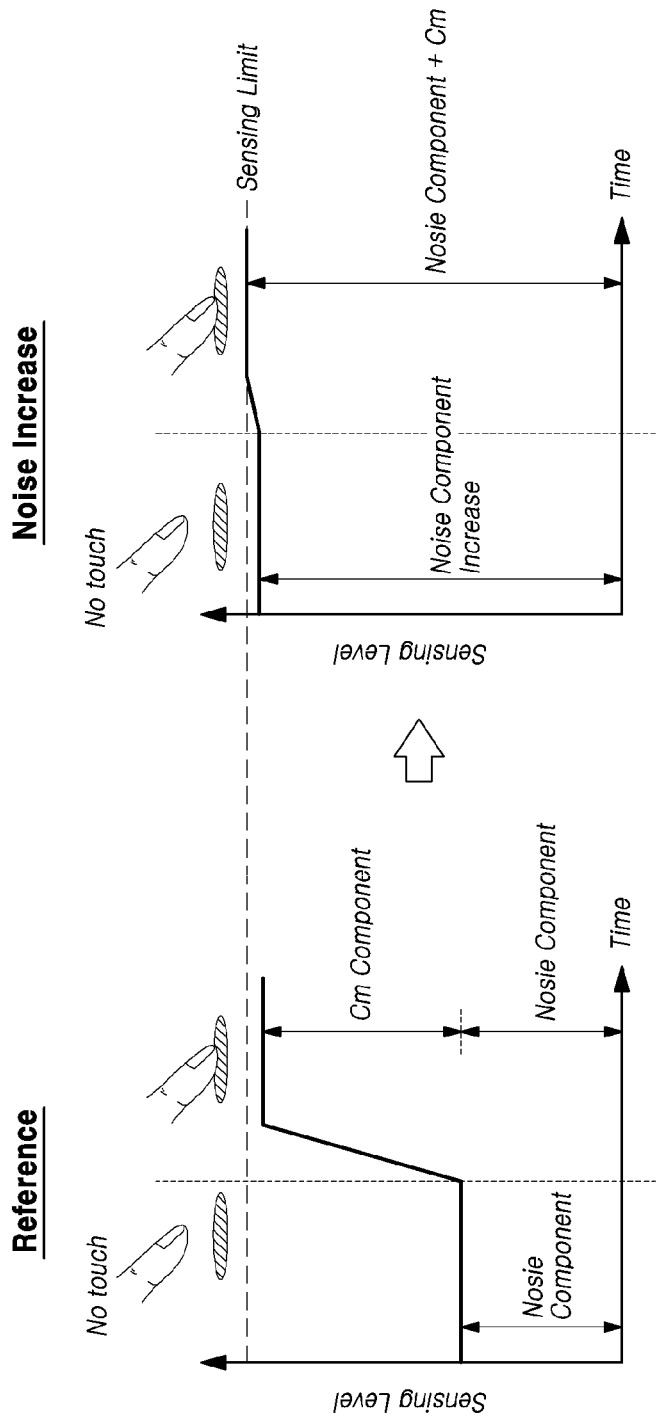

FIGS. 9 and 10 are views illustrating a phenomenon in which a touch malfunction occurs due to noise generated during touch driving in the touch display device according to embodiments of the present disclosure.

Referring to FIG. 9, during a touch-driving period in which a driving signal is applied to the driving touch electrodes TEd and a sensing signal is detected from the sensing touch electrodes TEs, a signal or voltage, which is not related to the touch sensing, may flow into a touch sensor metal, such as driving touch electrodes TEd, sensing touch electrodes TEs, and touch lines.

A signal or voltage, which has flown into the touch sensor metal may act as noise that hinders touch sensing (touch driving).

In this specification, "noise" may indicate any influencing factors that undesirably change the voltage state of the touch sensor metal.

For example, noise can be generated in the touch sensor metal due to the voltage state of an electrode related to display driving (e.g., a data line, a gate line, or a pixel electrode) formed on the display part or the like.

For example, due to the slimming of the touch display device, the driving touch electrodes TEd and the sensing touch electrodes TEs become closer to the display part, and thus the noise flowing from the display part may be generated in a greater amount in the driving touch electrodes TEd and the sensing touch electrodes TEs.

For example, due to the touch display device being made slimmer, the driving touch electrodes TEd and the sensing touch electrodes TEs become closer to a finger or the like, and thus the noise flowing from the outside of the touch display device may be generated more greatly in the driving touch electrodes TEd and the sensing touch electrode TEs.

When such noise is generated, the noise may affect the electrical states of the driving touch electrodes TEd and the sensing touch electrodes TEs.

Accordingly, the mutual capacitance Cm or the magnitude of change Cm thereof between the driving touch electrodes TEd and the sensing touch electrodes TEs may be calculated abnormally, and thus touch-sensing accuracy may deteriorate.

Referring to FIG. 10, the sensing value (sensing level) of the touch-sensing circuit TSC may be obtained under a predetermined sensing limit, and when there is noise, the sensing value (sensing level) may be obtained as a value equal to the sum of a noise component and a mutual capacitance component.

When the noise increases, due to a sensing limit, an actual sensing value corresponding to the mutual capacitance component becomes small and the accuracy of the touch-sensing result may deteriorate by a substantial reduction in the sensing value.

Due to the slimming or weight reduction of the touch display device, the distance between the touch electrodes TEd and TEs and the display part and the distance between the touch electrodes TEd and TEs, and thus a finger become closer to each other, the touch electrodes TEd and TEs may be more strongly affected by noise, and touch sensitivity may deteriorate accordingly during touch driving.

Figure 11:
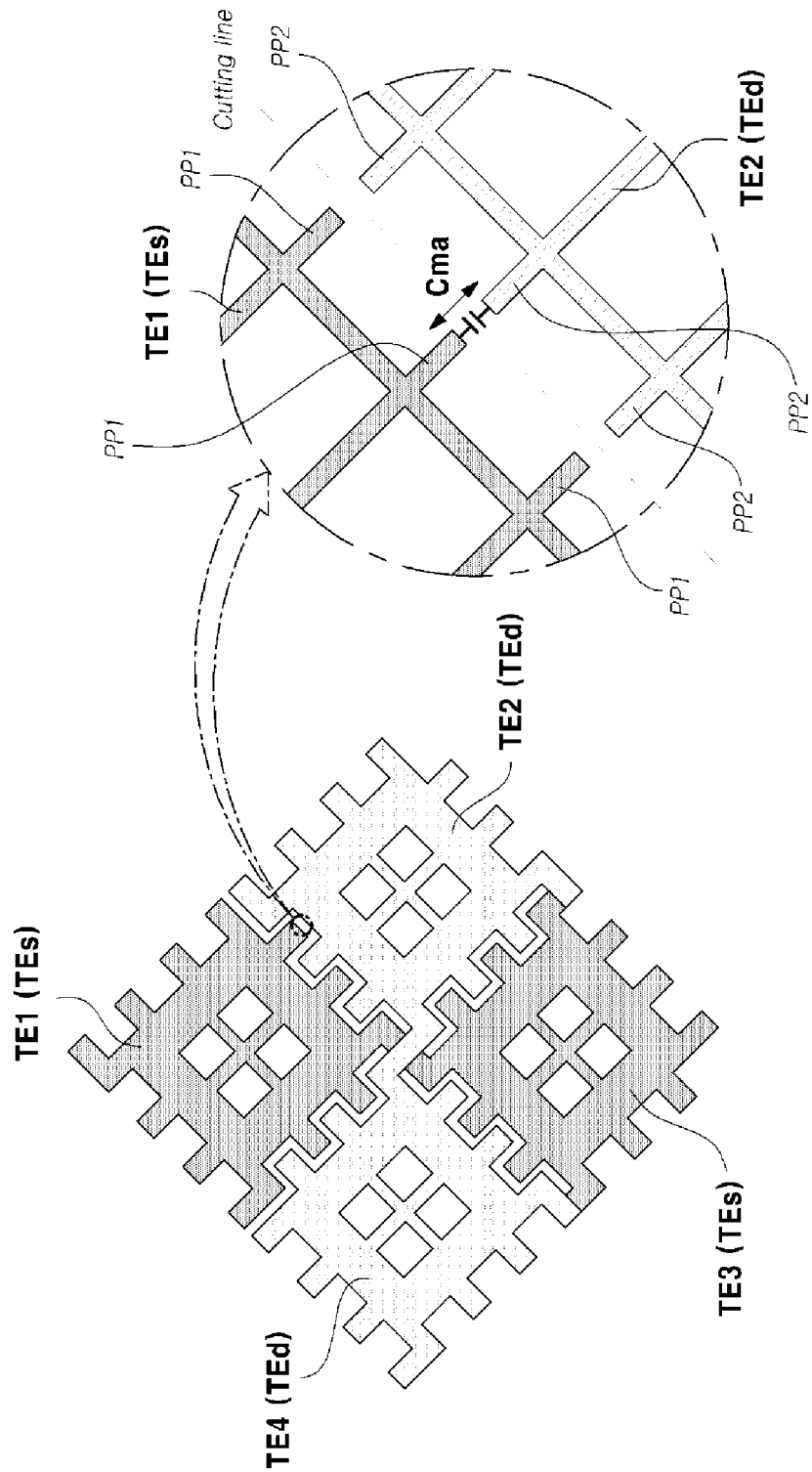
FIG. 11 is a diagram illustrating a first touch electrode outline structure in the touch display device according to embodiments of the present disclosure.

FIG. 11 is a diagram illustrating a first touch electrode outline structure in the touch display device according to embodiments of the present disclosure.

Referring to FIG. 11, under the touch panel (TSP)-based structure of FIG. 3, when two driving touch electrodes TEd (TE2 and TE4) and two sensing touch electrodes TEs (TE1 and TE3) are arranged adjacent to each other, the first touch electrodes TE1 corresponding to the sensing touch electrodes TEs and the second touch electrodes TE2 corresponding to the driving touch electrodes TEd are disposed adjacent to each other.

According to the first touch electrode outline structure, referring to an enlarged-view portion of a boundary area between the first touch electrode TE1 corresponding to the sensing touch electrode TEs and the second touch electrode TE2 corresponding to the driving touch electrode TEd, protrusions PP1 may exist in the outline portion of the first touch electrode TEL Protrusions PP2 may also exist in the outline portion of the second touch electrode TE2. For example, outer edges of the first and second touch electrodes can fit together similar to puzzle pieces, while still be electrically isolated from each other, thus increasing the mutual capacitance between the two electrodes.

This protrusion structure is produced by cutting the first touch electrode TE1 and the second touch electrode TE2 along a cutting line in order to form an electrode metal EM and to distinguish the first touch electrode TE1 and the second touch electrode TE2 from each other. For example, a common mesh layer can be disposed across a surface and then lines can be cut (e.g., laser cut or etched) to remove portions of the common mesh layer, in order to define touch electrodes.

In consideration of the shortest distance between the protrusions PP1 of the first touch electrode TE1 and the protrusions PP2 of the second touch electrode TE2, it is assumed that the mutual capacitance Cm formed between the first touch electrode TE1 and the second touch electrode TE2 is Cma.

In addition, capacitance C is characterized in that the capacitance C is inversely proportional to the distance between two electrodes forming the capacitance C and directly proportional to the area of the two electrodes.

According to the above-described first touch electrode outline structure, due to the protruding structure, the first touch electrode TE1 and the second touch electrode TE2 can be closer to each other, and thus the mutual capacitance Cm can be further increased.

Hereinbelow, second and third touch electrode outline structures will be described, which are capable of further increasing the mutual capacitance Cm or the magnitude of change Cm thereof even when noise is generated, thereby improving touch sensitivity.

Figure 12:
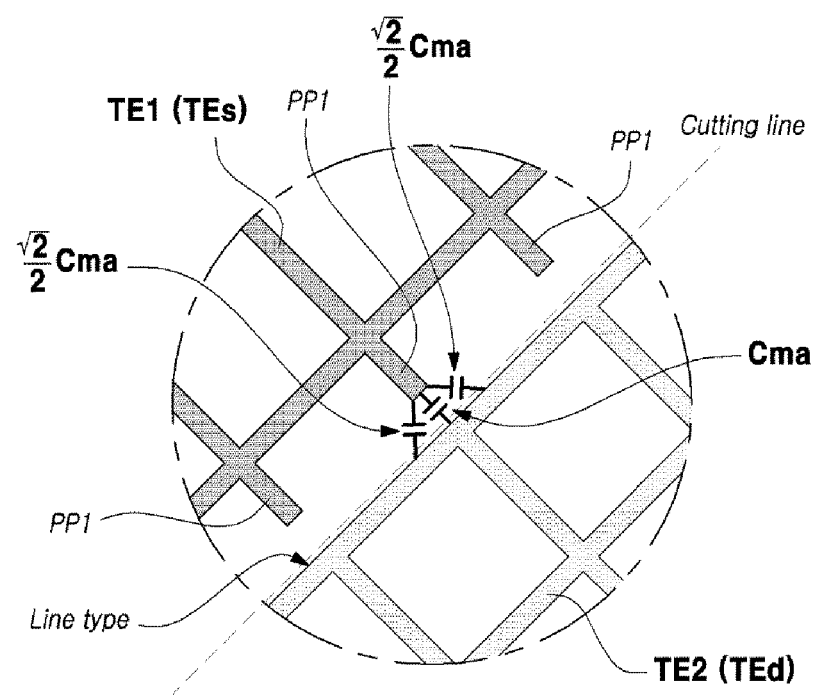
FIG. 12 is a diagram illustrating a second touch electrode outline structure of the touch display device according to embodiments of the present disclosure.
Figure 13:
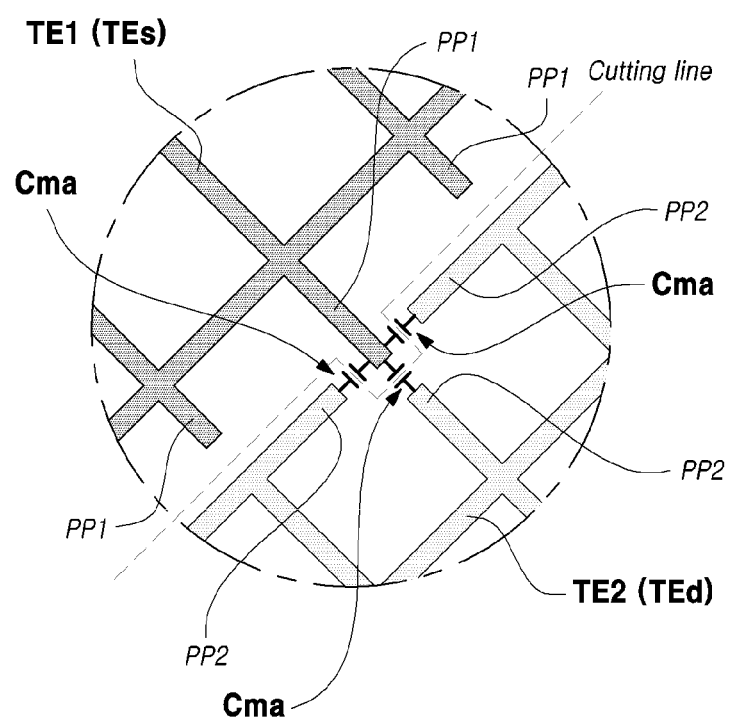
FIG. 13 is a diagram illustrating a third touch electrode outline structure in the touch display device according to embodiments of the present disclosure.

FIG. 12 is a diagram illustrating a second touch electrode outline structure of the touch display device according to embodiments of the present disclosure, and FIG. 13 is a diagram illustrating a third touch electrode outline structure in the touch display device according to embodiments of the present disclosure.

As illustrated in FIG. 11, when two driving touch electrodes TEd (TE2 and TE4) and two sensing touch electrodes TEs (TE1 and TE3) are arranged adjacent to each other, the first touch electrodes TE1 corresponding to the sensing touch electrodes TEs and the second touch electrodes TE2 corresponding to the driving touch electrodes TEd are disposed adjacent to each other.

The first touch electrode TE1 corresponding to the sensing touch electrode TEs and the second touch electrode TE2 corresponding to the driving touch electrode TEd are electrically separated from each other (e.g., electrically isolated from each other).

As illustrated in FIGS. 12 and 13, in the touch display device according to the present embodiments, in the boundary area between the first touch electrode TE1 and the second touch electrode TE2, the outline portion of the first touch electrode TE1 and the outline portion of the second touch electrode TE2 can have different shapes (e.g., the outer edge of the first touch electrode can have a different shape than the outer edge of the second touch electrode).

Accordingly, even if noise is generated, it is possible to obtain larger mutual capacitance Cm or the magnitude of change Cm thereof, and accordingly, to improve touch sensitivity.

In the touch display device according to the present embodiments, a touch electrode outline structure that enables larger mutual capacitance Cm or the magnitude of change Cm thereof to be obtained, even if noise occurs, can include the second touch electrode outline structure of FIG. 12 and the third touch electrode outline structure of FIG. 13.

Referring to FIG. 12, according to the second touch electrode outline structure, in the boundary area between the first touch electrode TE1 and the second touch electrode TE2, one or more protrusions PP1 may exist in only one of the outline portion of the first electrode TE1 and the outline portion of the second touch electrode TE2 (in the example of FIG. 12, the outline portion of the first touch electrode TE1), and no protrusion may exist in the remaining one thereof (in the example of FIG. 12, the outline portion of the touch electrode TE2). For example, the first touch electrode TE1 can have an edge with a series of protrusions or a perforated edge, which is adjacent to a flat edge of the second touch electrode TE2.

Referring to FIG. 12, the outline portion of the second touch electrode TE2 in which no protrusion exists can be formed in a line type (e.g., the second touch electrode can have an outer edge that is flat or an outer edge that is formed in a straight line).

Considering the capacitance characteristic and assuming that the shortest distance from the one or more protrusions PP1 existing in the outline portion of the first touch electrode TE1 to the outline portion of the second touch electrode TE2, the outline portion of which is in the line type, is the same as the shortest distance between the protrusions PP of the first touch electrode TE1 and the protrusions PP2 of the second touch electrode TE2 in FIG. 11, the mutual capacitance between the first touch electrode TE1 and the second touch electrode TE2 according to the second touch electrode outline structure is approximately Cma+(v2/2)×Cma+(v2/2)×Cma.

As described above, it can be seen that the mutual capacitance according to the second touch electrode outline structure of FIG. 12 becomes larger than the mutual capacitance according to the first touch electrode outline structure of FIG. 11. Therefore, according to the second touch electrode outline structure, touch sensitivity can be improved.

In FIG. 12, protrusions exist on the sensing touch electrode TEs, but protrusions may also exist on the driving touch electrode TEd. Alternatively, at a first position, a protrusion can exist on the sensing touch electrode TEs, and at a second position, a protrusion can exist on the driving touch electrode TEd.

Referring to FIG. 13, according to the third touch electrode outline structure, at least one protrusion PP1 can exist in the outline portion of the first touch electrode TE1 corresponding to the sensing touch electrode TEs, and at least one protrusion PP2 can exist in the outline portion of the second touch electrode TE2 corresponding to the driving touch electrode TEd.

Referring to FIG. 13, according to the third touch electrode outline structure, at least one protrusion PP1 existing in the outline portion of the first touch electrode TE1 and at least one protrusion PP2 existing in the outline portion of the second touch electrode TE2 can have different sizes or different lengths.

Referring to FIG. 13, according to the third touch electrode outline structure, the sizes of two or more protrusions PP1 existing in the outline portion of the first touch electrode TE1 can be different from each other (e.g., some protrusions can be long and some protrusions can be short). In addition, the sizes of two or more protrusions PP2 existing in the outline portion of the second touch electrode TE2 can be different from each other (e.g., some protrusions can be long and some protrusions can be short). Also, the protrusions can extend in different directions.

According to the example of FIG. 13, at least one protrusion PP1 existing in the outline portion of the first touch electrode TE1 can be larger than at least one protrusion PP2 existing in the outline portion of the second touch electrode TE2.

According to the third touch electrode outline structure, at least one protrusion PP1 existing in the outline portion of the first touch electrode TE1 protrudes closer to the area of the second touch electrode TE2 or protrudes into the area of the second touch electrode TE2, and thus the distance between the first touch electrode TE1 and the second touch electrode TE2 becomes even smaller, so that the mutual capacitance formed between the first touch electrode TE1 and the second touch electrode TE2 can be further increased.

Referring to FIG. 13, at least one protrusion PP1 in the outline portion of the first touch electrode TE1 can protrude into an area occupied by the outline portion of the second touch electrode TE2 (e.g., at least one protrusion PP1 can extend past an outermost edge of the touch electrode TE2).

Referring to FIG. 13, at least one protrusion PP1 existing in the outline portion of the first touch electrode TE1 protrudes into a space between at least two protrusions PP2 existing in the outline portion of the second touch electrode TE2.

Considering the capacitance characteristic and assuming that the shortest distance from the protrusion PP1 of the first touch electrode TE1 to the protrusion PP2 of the second touch electrode TE2 is the same as the shortest distance between the protrusions PP1 of the touch electrode TE1 and the protrusions PP2 of the second touch electrode TE2 in FIG. 11, the mutual capacitance between the first touch electrode TE1 and the second touch electrode TE2 according to the third touch electrode outline structure becomes approximately 3Cma(=Cma+Cma+Cma).

According to the third touch electrode outline structure, the distance between the first touch electrode TE1 and the second touch electrode TE2 becomes smaller, so that the mutual capacitance formed between the first touch electrode TE1 and the second touch electrode TE2 can be further increased.

In FIG. 13, the protrusion of the sensing touch electrode TEs protrudes farther than the protrusion of the driving touch electrode TEd. However, the protrusion of the driving touch electrode TEd may protrude farther. A protrusion of the sensing electrode TEs may be larger at a first position and a protrusion of the driving touch electrode TEd may be larger at a second position.

Referring to FIGS. 11 to 13, one of the first touch electrode TE1 and the second touch electrode TE2 is a driving touch electrode TEd and the remaining one thereof is a sensing touch electrode TEs.

Therefore, the touch-sensing circuit TSC can apply a driving signal to one of the first touch electrode TE1 and the second touch electrode TE2 and can receive a sensing signal from the remaining one.

Accordingly, the touch display device is capable of sensing a touch based on the mutual capacitance.

Figure 14:
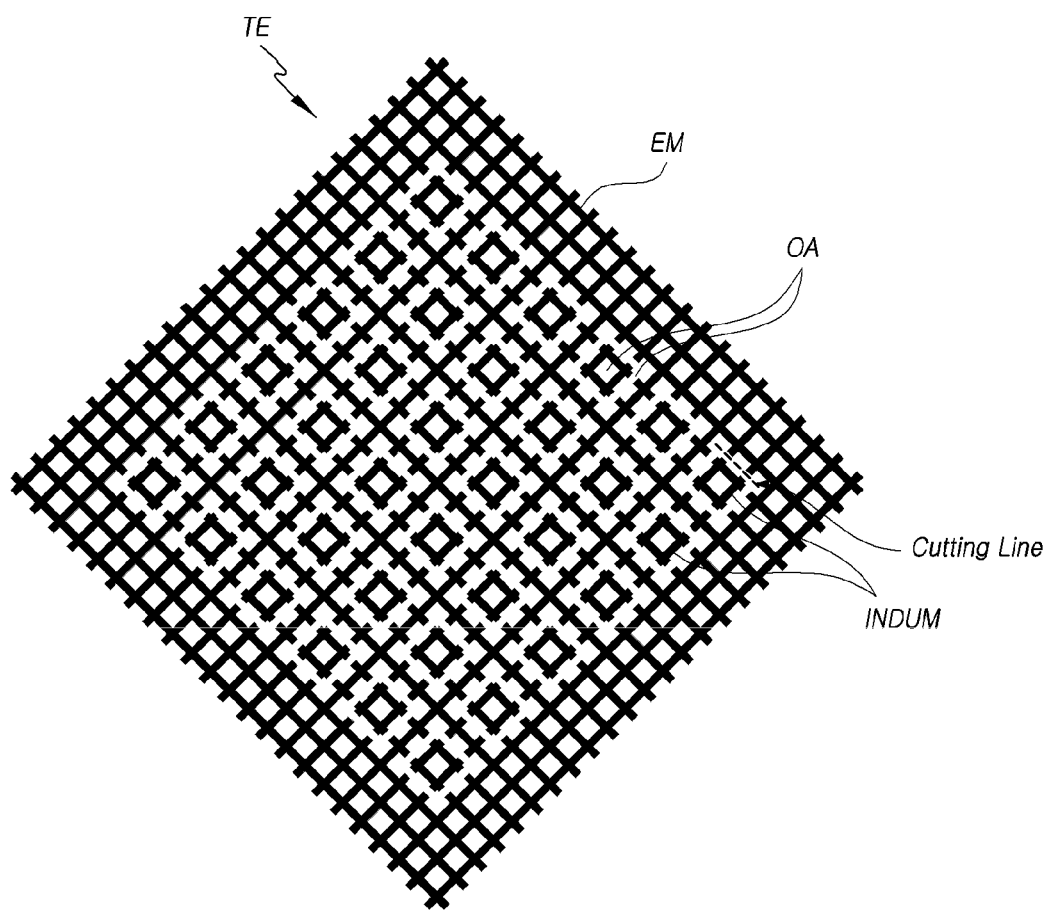
FIGS. 14 to 16 are diagrams each illustrating the situation where an internal dummy metal is present in a mesh-type touch electrode area disposed on a touch panel in the touch display device and/or the situation where pieces of metal are removed from a mesh-type touch electrode area according to embodiments of the present disclosure.
Figure 15:
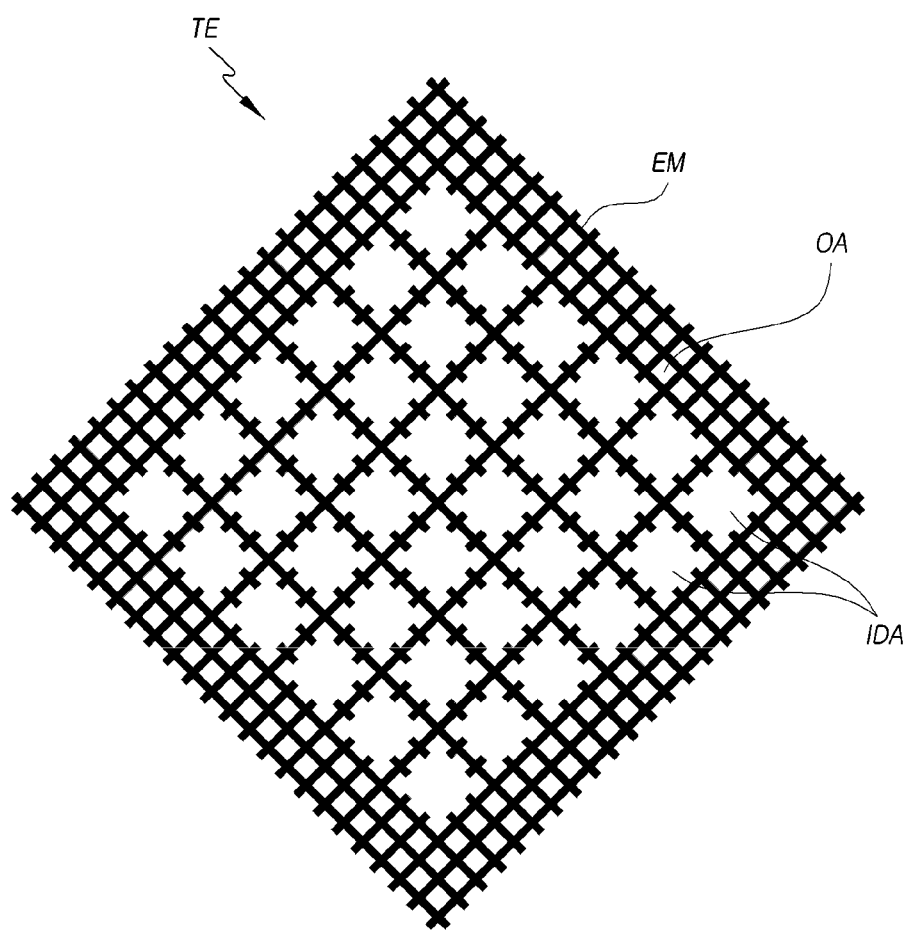
Figure 16:
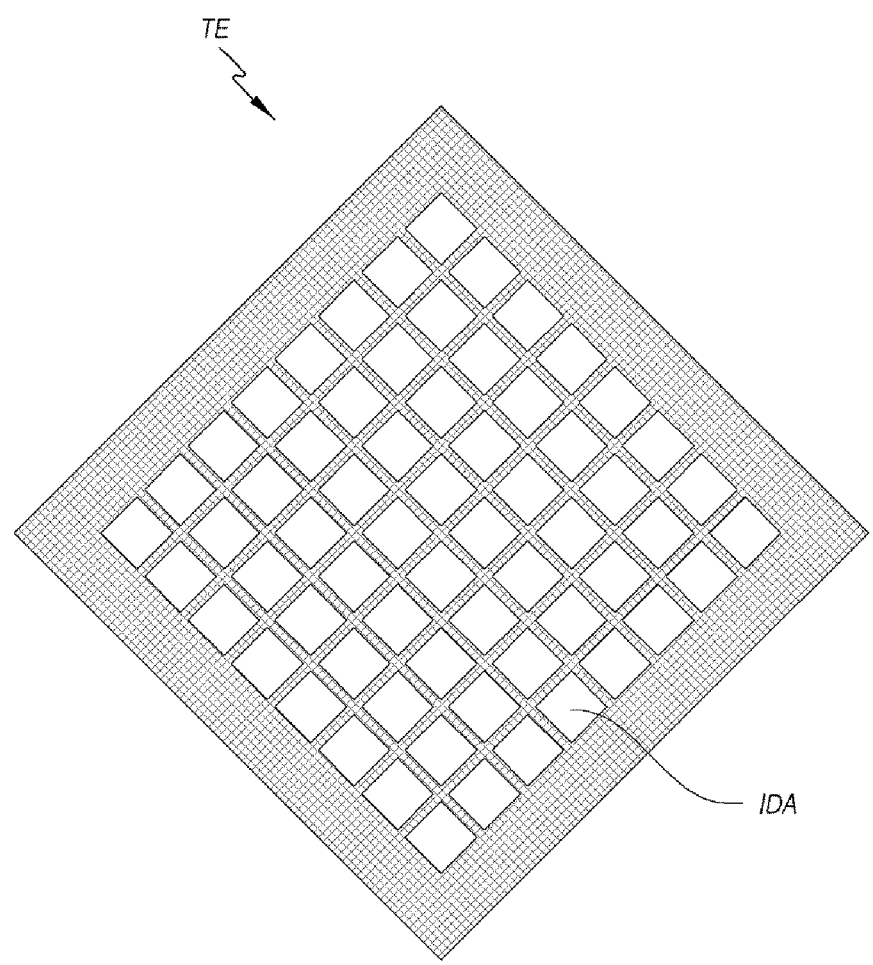

FIGS. 14 to 16 are diagrams each illustrating the situation where an internal dummy metal INDUM is present in a mesh-type touch electrode TE area disposed on a touch panel TSP in the touch display device according to embodiments of the present disclosure. For example, the piece of dummy metal can be referred to as "internal" because it is inside of the touch electrode but electrically isolated from the electrode (e.g., within the outer perimeter of the electrode), even though the dummy metal pieces can be on top of a layer or embedded within a layer, or used inside an in-cell or on-cell type of touchscreen or touch panel according to embodiments.

Referring to FIGS. 14 to 16, in the area of all or some of the plurality of touch electrodes TE disposed on the touch panel TSP, at least one internal dummy metal INDUM cut from an electrode metal EM patterned in a mesh type can be disposed.

In addition, when the at least one internal dummy metal INDUM does not exist in the area of one touch electrode TE and only the electrode metal EM exists in the mesh type, there may occur a visibility problem in which the outline of the electrode metal EM is visible on a screen (e.g., the touch electrode may block too much light). However, by forming the internal dummy metal INDUM in the touch electrode area, it is possible to prevent the visibility problem that may arise when one touch electrode TE is patterned in the form of a mesh (e.g., cuts can be performed inside a touch electrode to allow more light to pass through it, thus improving image quality). For example, pieces of dummy metal can be provided within the mesh-type electrode in order to provide a uniform appearance across a touch screen while also reducing the power used to drive the touch electrodes.

The electrode metal EM is patterned in the form of a mesh (e.g., net like structure), and then the electrode metal EM patterned in the form of a mesh is cut in order to form a touch electrode (a cutting process for touch electrode formation).

Thereafter, the electrode metal EM patterned in the form of a mesh in one touch electrode area is cut into a predetermined pattern (a cutting process for internal dummy metal formation) to form an internal dummy metal INDUM which is cut from the electrode metal EM (e.g., the internal dummy metal INDUM is electrically isolated from the electrode metal EM). For example, pieces of internal dummy metal INDUM can be cut out of a mesh layer or a mesh-type electrode with a laser or etching, similar to how cookies can be cut from a layer of dough with a cookie cutter or how a pizza can be cut into slices.

When the internal dummy metal INDUM is formed as described above, the internal dummy metal INDUM is a portion cut from the electrode metal EM by the cutting process.

Accordingly, at least one internal dummy metal INDUM in the touch electrode area can be disposed in the same layer as the electrode metal EM corresponding to each of the plurality of touch electrodes TE and can be made of the same material as the electrode metal EM.

According to the method of forming the internal dummy metal INDUM described above, there is an advantage in that the internal dummy metal INDUM can be formed more easily and in that the electrode metal EM and the dummy metal DM can be formed in a single layer, and the touch electrodes can be spaced closer together since that can be cut from a same common mesh layer.

FIG. 15 is a diagram illustrating an electrode metal EM corresponding to a touch electrode TE in which the internal dummy metal INDUM is omitted in FIG. 14, and FIG. 16 is a diagram illustrating FIG. 15 in a simplified form.

Referring to FIGS. 15 and 16, it can be seen that the size of the electrode metal to which a driving signal is applied or from which a sensing signal is received at one touch electrode TE is reduced by the space IDA occupied by the internal dummy metal INDUM.

Figure 17:
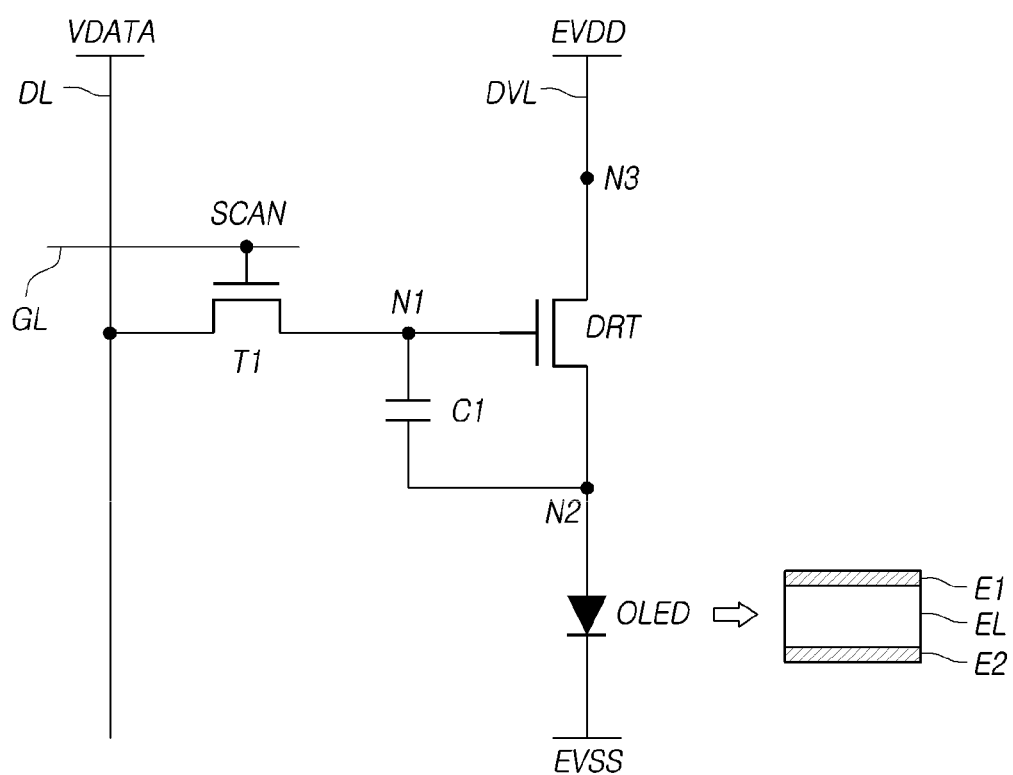
FIG. 17 is an example view of the structure of a sub-pixel in the touch display device according to embodiments of the present disclosure.
Figure 18:
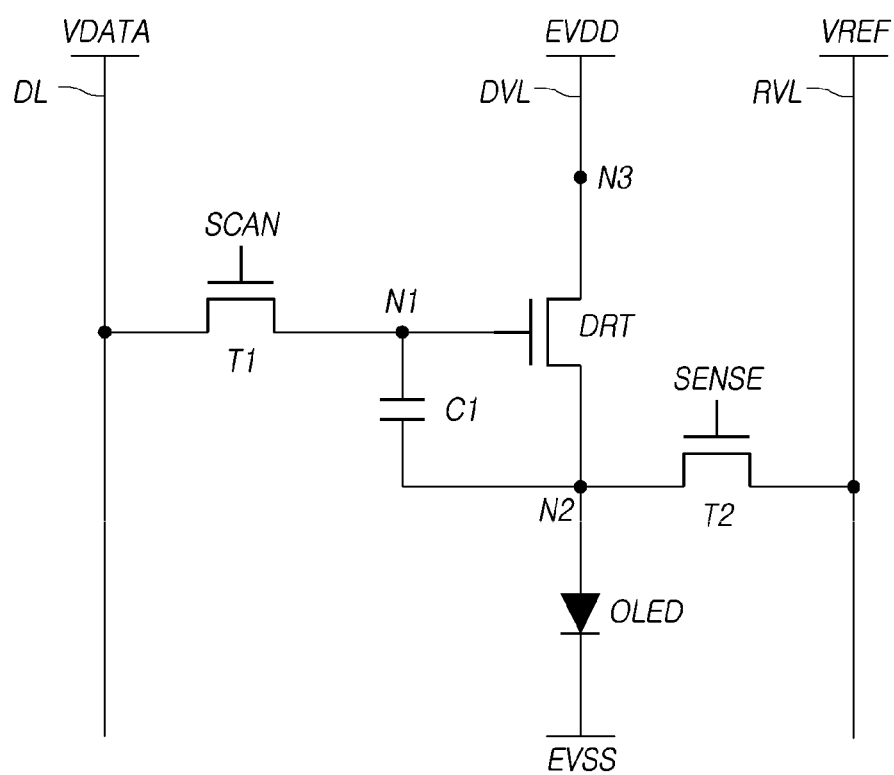
FIG. 18 is another example view of the structure of a sub-pixel in the touch display device according to embodiments of the present disclosure.

FIG. 17 is an example view of the structure of a sub-pixel in the touch display device according to the embodiments of the present disclosure, and FIG. 18 is another example view of the structure of a sub-pixel in the touch display device according to embodiments of the present disclosure.

Referring to FIG. 17, when the touch display device 100 according to the embodiments is an OLED display device, each sub-pixel can include an OLED, a driving transistor DRT configured to drive the OLED, a first transistor T1 configured to transmit a data voltage to a first node N1 corresponding to a gate node of the driving transistor DRT, and a storage capacitor Cst configured to maintain a data voltage corresponding to an image signal voltage or a voltage corresponding thereto for one frame period.

The OLED can include a first electrode E1 (e.g., an anode electrode or a cathode electrode), an organic light-emitting layer EL, a second electrode E2 (e.g., a cathode electrode or an anode electrode), and the like.

A ground voltage EVSS can be applied to the second electrode E2 of the OLED.

The driving transistor DRT drives the OLED by supplying a driving current to the OLED.

The driving transistor DRT has a first node N1, a second node N2, and a third node N3.

The first node N1 of the driving transistor DRT is a node corresponding to a gate node, and can be electrically connected to a source node or a drain node of the first transistor T1.

The second node N2 of the driving transistor DRT can be electrically connected to the first electrode E1 of the OLED, and may be a source node or a drain node.

The third node N3 of the driving transistor DRT may be a node to which a driving voltage EVDD is applied, and may be electrically connected to a driving voltage line DVL that supplies the driving voltage EVDD. The third node N3 can be a drain node or a source node.

The first transistor T1 is electrically connected between the data line DL and the first node N1 of the driving transistor DRT, and can be controlled by receiving a scan signal SCAN applied to the gate node thereof through the gate line.

The first transistor T1 may be turned on by the scan signal SCAN to transmit the data voltage Vdata supplied from the data line DL to the first node N1 of the driving transistor DRT.

The storage capacitor Cst can be electrically connected between the first node N1 and the second node N2 of the driving transistor DRT.

The storage capacitor Cst is not a parasitic capacitor (e.g., Cgs or Cgd) which is an internal capacitor existing between the first node N1 and the second node N2 of the driving transistor DRT, but an external capacitor intentionally designed outside the driving transistor DRT.

In addition, as illustrated in FIG. 18, each sub-pixel can further include a second transistor T2 in order to control the voltage of the second node N2 of the driving transistor DRT or to sense the characteristic value of the sub-pixel (e.g., the threshold voltage or mobility of the driving transistor DRT or the threshold voltage of the OLED).

The second transistor T2 can be electrically connected between the second node N2 of the driving transistor DRT and the reference voltage line RVL that supplies a reference voltage Vref, and can be controlled by receiving a sensing signal SENSE, which is a kind of scan signal, by the gate node.

The second transistor T2 is turned on by the sensing signal SENSE to apply the reference voltage Vref supplied via the reference voltage line RVL to the second node N2 of the driving transistor DRT.

In addition, the second transistor T2 may be utilized as one of voltage-sensing paths for the second node N2 of the driving transistor DRT.

In addition, the scan signal SCAN and the sense signal SENSE can be separate gate signals. In this instance, the scan signal SCAN and the sensing signal SENSE may be respectively applied to the gate node of the first transistor T1 and the gate node of the second transistor T2 via different gate lines.

In some situations, the scan signal SCAN and the sensing signal SENSE may be the same gate signal. In this instance, the scan signal SCAN and the sensing signal SENSE may be commonly applied to the gate node of the first transistor T1 and the gate node of the second transistor T2 via the same gate line.

Each of the driving transistor DRT, the first transistor T1, and the second transistor T2 can be an n-type transistor or a p-type transistor.

Each sub-pixel structure can be modified in various ways in addition to those illustrated in FIGS. 17 and 18.

Figure 19:
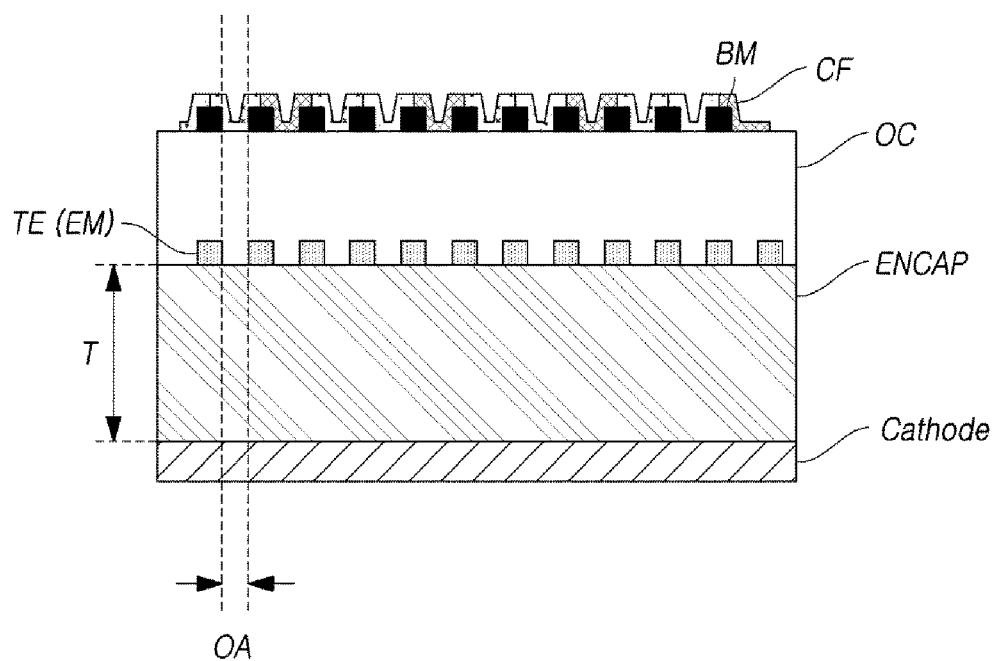
FIGS. 19 to 21 are cross-sectional diagrams each illustrating a touch display device according to embodiments of the present disclosure.
Figure 20:
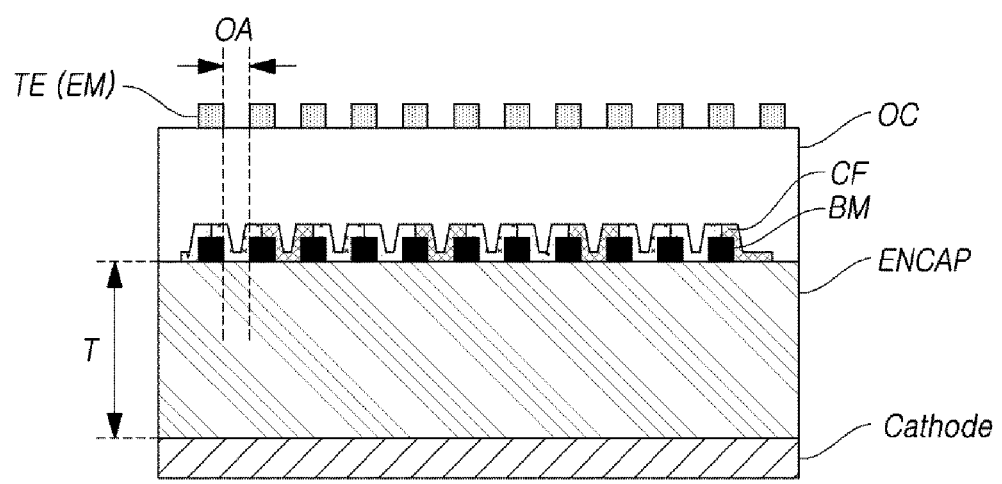
Figure 21:
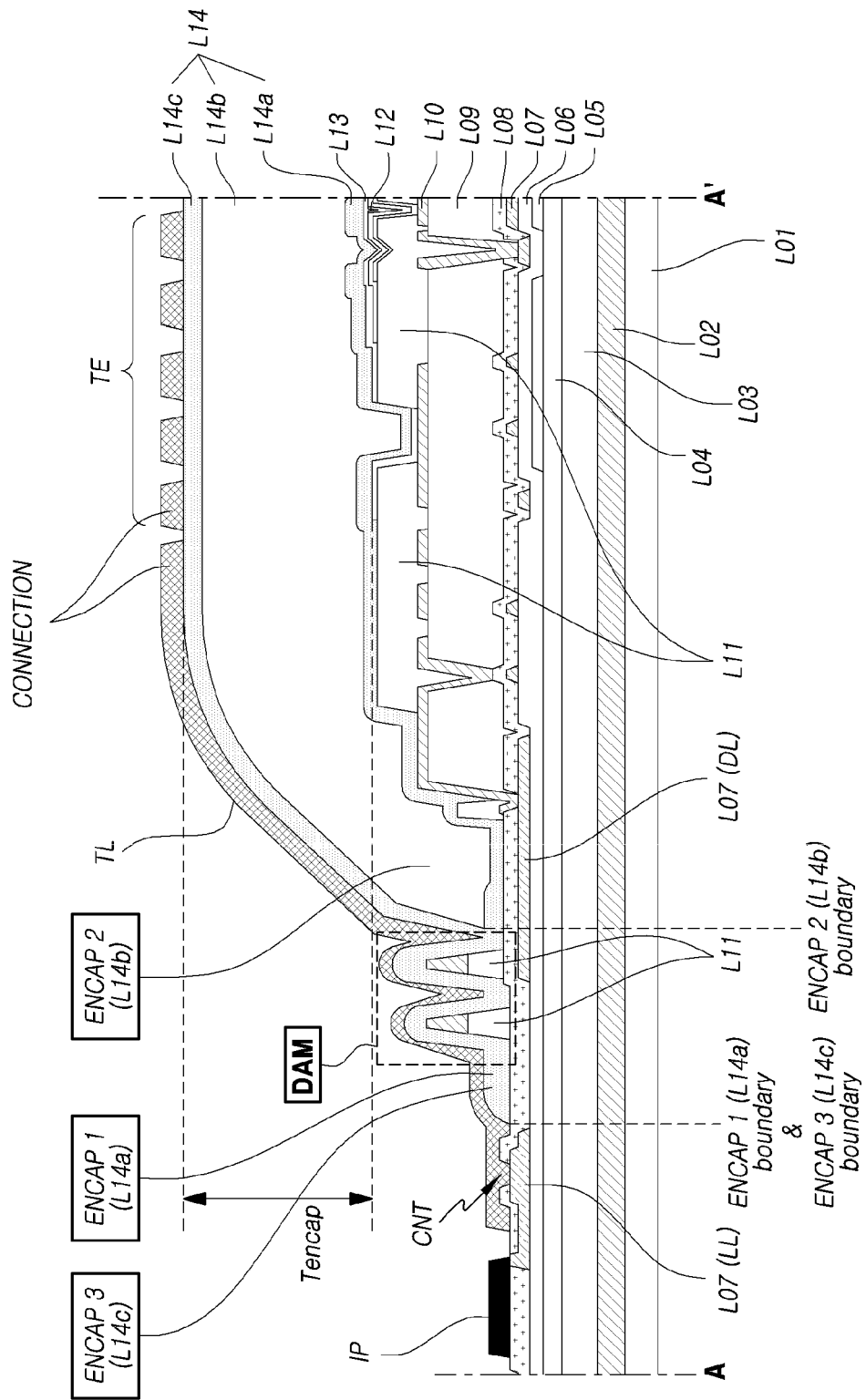

FIGS. 19 to 21 are cross-sectional diagrams each illustrating a touch display device according to embodiments of the present disclosure.

Referring to FIGS. 19 and 21, when a touch panel TSP is built into a display panel DISP and the display panel DISP is implemented as an OLED display panel, the touch panel TSP can be placed on an encapsulation layer ENCAP in the display panel DISP. In other words, touch sensor metal such as a plurality of touch electrodes TE and a plurality of touch lines TL can be placed on the encapsulation layer ENCAP in the display panel DISP.

As described above, by forming the touch electrodes TE on the encapsulation layer ENCAP, the touch electrodes TE can be formed without greatly affecting the display performance or the formation of a layer for the display.

In addition, referring to FIGS. 19 and 21, a cathode (Cathode), which may be the second electrode E2 of the OLED, may be present below the encapsulation layer ENCAP.

The thickness T of the encapsulation layer ENCAP can be, for example, approximately 5 micrometers or more.

As described above, parasitic capacitance formed between the cathode (Cathode) of the OLED and the touch electrodes TE can be reduced by designing the thickness of the encapsulation layer ENCAP to be approximately 5 micrometers or more. Thus, it is possible to prevent deterioration in touch sensitivity due to parasitic capacitance.

As described above, each of the plurality of touch electrodes TE is patterned in the form of a mesh in which the electrode metal EM has a plurality of open areas OA. In the plurality of open areas OA, one or more sub-pixels or light-emitting areas thereof can exist when viewed in a vertical direction.

As described above, the electrode metals EM of the touch electrodes TE are patterned such that, when viewed in a plan view, the light-emitting area of at least one sub-pixel exists to correspond to the position of each of the open areas OA existing in the area of the touch electrodes TE, whereby it is possible to enhance the light emission efficiency of the display panel DISP.

Accordingly, as illustrated in FIGS. 19 and 20, the position of a black matrix BM can correspond to the position of the electrode metals EM of the touch electrodes TE.

In addition, the positions of a plurality of color filters CF correspond to the positions of the plurality of touch electrodes TE.

As described above, since the plurality of color filters CF is located at positions corresponding to the positions of the plurality of open areas OA, it is possible to provide an OLED display panel (in particular, when a white OLED is used) and a touch display device having excellent light emission performance.

The vertical positional relationship between the plurality of color filters CF and the plurality of touch electrodes TE will now be described.

As illustrated in FIG. 19, the plurality of color filters CF (e.g., RGB, or RGBW) and the black matrix BM can be placed on the plurality of touch electrodes TE.

The plurality of color filters CF and the black matrix BM can be placed on an overcoat layer OC on the plurality of touch electrodes TE.

As illustrated in FIG. 20, the plurality of color filters CF and the black matrix BM can be placed under the plurality of touch electrodes TE.

The plurality of touch electrodes TE can be placed on the overcoat layer OC on the plurality of color filters CF and the black matrix BM.

As described above, it is possible to provide a touch display device having an optimal positional relationship between the color filters CF and the touch electrodes TE in consideration of display performance such as light-emitting performance, and touch performance.

In addition, attempts to incorporate a touch panel TSP including touch electrodes TE in a display panel DISP have been made in order to improve convenience of manufacture of the touch display device and to reduce the size of the touch display device.

However, in order to incorporate the touch panel TSP in the display panel DISP, which is an OLED display panel, considerable difficulties and many limitations exist.

For example, during the process of manufacturing a display device DISP, which is an OLED display panel, there is a limit in that a high-temperature process for forming touch electrodes TE, which are generally made of a metallic material, inside the panel cannot be freely performed due to an organic material.

It is difficult to arrange the touch electrodes TE serving as touch sensors inside the display panel DISP, which is an OLED display panel, due to constraints such as structural characteristics and processing of the OLED display panel.

Therefore, in the related art, a touch structure has been implemented by attaching a touch panel TSP onto a display panel DISP, which is an OLED display panel, rather than incorporating the touch panel TSP in a display panel DISP, which is an OLED display panel.

However, as illustrated in FIGS. 19 and 20, it is possible to provide a display panel DISP, which is an OLED display panel, in which a touch panel TSP having excellent display performance and touch performance is incorporated through a structure of forming the touch electrodes TE on the encapsulation layer ENCAP, for example.

Referring to FIG. 21, a polyimide layer L02 is disposed on a substrate or a back plate L01.

A buffer layer L03 can be placed on the polyimide layer L02, and an interlayer insulating film L04 can be placed on the buffer layer L03.

A gate layer L05 can be present on the interlayer insulating film L04, and gate electrodes or the like may be formed on the gate layer L05 at various positions.

A gate insulating film L06 can be present on the gate layer L05.

A source/drain layer L07 can be present on the gate insulating film L06.

In the source/drain layer L07, signal lines such as data lines DL and a link line LL for metal connection, source/drain electrodes of various transistors, etc. can be formed.

A protective layer L08 can be present on the source/drain layer L07.

A planarization layer L09 can be placed on the protective layer L08, and a first electrode layer L10 in which a first electrode E1 is formed at the light emission position of each sub-pixel SP, can be present on the planarization layer L09.

A bank L11 is placed on the first electrode layer L10, and an organic light-emitting layer L12 is placed on the bank L11.

A second electrode layer L13, which is formed in common to all the sub-pixel areas, can be present on the organic light-emitting layer L12.

On the second electrode layer L13, an encapsulation layer L14 can be present to prevent penetration of moisture, air, or the like.

In addition, a dam (DAM) can exist in a panel edge.

The encapsulation layer L14 can be a single layer, or can be formed by laminating two or more layers. Further, the encapsulation layer L14 cam be formed of a metallic layer, or can be formed by laminating two or more organic layers and inorganic layers.

FIG. 21 illustrates a situation in which the encapsulation layer L14 is formed by laminating a first encapsulation layer L14a, a second encapsulation layer L14b, and a third encapsulation layer L14c.

Each of the first encapsulation layer ENCAP 1 (L14a), the second encapsulation layer ENCAP 2 (L14b), and the third encapsulation layer ENCAP 3 (L14c) may be constituted with an organic layer and an inorganic layer.

The touch electrodes TE are formed on the encapsulation layer L14 described above.

The touch electrodes TE are an example of a mesh type having open areas OA. In this instance, the touch electrodes TE can be transparent electrodes.

A touch line TL can also be formed on the encapsulation layer L14.

The touch line TL and the touch electrodes TE can be formed on different layers or on the same layer.

The touch line TL connected to the touch electrodes TE extends through the area where the dam (DAM) is located, and extends to the area outside the dam, that is, the area adjacent to a pad IP.

The touch line TL may be connected to the link line LL formed in the source/drain layer L07 through a contact hole CNT in the area outside the dam.

The link line LL can be electrically connected to the pad IP existing in the area outside the dam for connection with the touch-driving circuit TDC.

The encapsulation layer L14 can be formed to have a predetermined thickness (Tencap). Here, the thickness (Tencap) of the encapsulation layer L14 can be designed in consideration of an RC delay and influence on touch performance (touch sensitivity) during touch driving and touch sensing.

In addition, the dam (DAM) can be formed at or near one or more boundary points of the first, second, and third encapsulation layers L14a, L14b, and L14c.

This dam (DAM) can be formed to be high by stacking the bank L11 and the encapsulation layer L14.

This dam (DAM) is capable of preventing the encapsulation layers L14a, L14b, and L14c from collapsing to the outline of the panel.

In addition, since the encapsulation layers L14a, L14b, and L14c partially extend, the dam (DAM) is capable of performing a sealing function, thereby protecting the pixels and the like from moisture and the like flowing into the inside of the panel from the side.

Referring to FIG. 21, a plurality of touch lines TL electrically connected to a plurality of touch electrodes TE is disposed on a display panel DISP. In the outline area of the display panel DISP (the area outside the dam), the encapsulation layer L14 may not be disposed under the plurality of touch lines TL.

In addition, an electrode metal EM corresponding to each of the plurality of touch electrodes TE can overlap a plurality of banks L11 defining a sub-pixel area.

Figure 22:
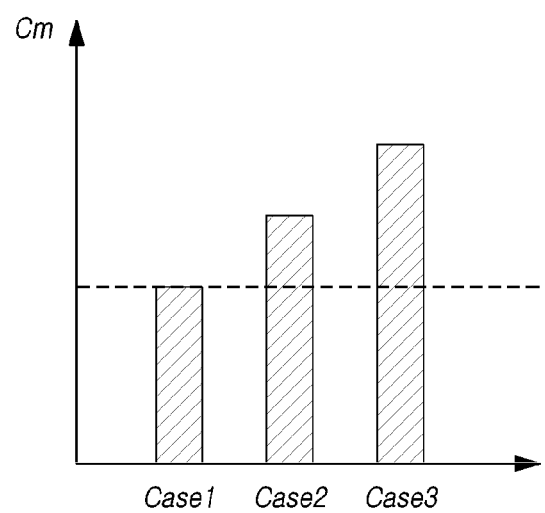
FIG. 22 is a graph showing the sizes of mutual capacitances depending on three touch electrode outline structures of the touch display device according to embodiments of the present disclosure.

FIG. 22 is a graph showing the sizes of mutual capacitances depending on three touch electrode outline structures of the touch display device according to embodiments of the present disclosure.

FIG. 22 is a graph showing the magnitudes of mutual capacitances formed between a driving touch electrode TEd and a sensing touch electrode TEs in each of the first touch electrode outline structure (Case 1) in FIG. 11, the second touch electrode outline structure (Case 2) in FIG. 12, and the third touch electrode outline structure (Case 3) in FIG. 13.

Referring to FIG. 22, the mutual capacitance in the third touch electrode outline structure (Case 3) of FIG. 13 is the largest, the mutual capacitance in the second touch electrode outline structure (Case 2) of FIG. 12 is the second-largest, and the mutual capacitance in the first touch electrode outline structure (Case 1) of FIG. 11 is the smallest.

In view of the embodiments described above, it is possible to provide a touch display device and a panel that enable accurate and noise-robust touch sensing.

According to the embodiments, it is possible to provide a touch display device and a panel having a touch electrode outline structure that enable accurate and noise-robust touch sensing.

According to the embodiments, it is possible to provide a touch display device and a panel that have a touch electrode outline structure which is capable of obtaining a large sensing value corresponding to a mutual capacitance component.

According to the embodiments, it is possible to provide a touch display device and a panel that enable accurate and noise-robust sensing even in a slim design structure.

The above description and the accompanying drawings provide an example of the technical idea of the present disclosure for illustrative purposes only. Those having ordinary knowledge in the technical field, to which the present disclosure pertains, will appreciate that various modifications and changes in form, such as combination, separation, substitution, and change of a configuration, are possible without departing from the features of the present disclosure. Therefore, the embodiments disclosed in the present disclosure are intended to illustrate the scope of the technical idea of the present disclosure, and the scope of the present disclosure is not limited by the embodiment. The scope of the present disclosure shall be construed based on the accompanying claims so all of the technical ideas included within the scope equivalent to the claims belong to the present disclosure.

What is claimed is:

1. A touch display device comprising:
   a substrate including a plurality of data lines, a plurality of gate lines, and a plurality of sub-pixels;
   an encapsulation layer on the substrate;
   a touch sensor disposed on the encapsulation layer and including a plurality of mesh type touch electrodes including a first touch electrode and a second touch electrode being adjacent to and electrically isolated from the first touch electrode and a touch line electrically connected to at least one of the plurality of touch electrodes;
   a touch-sensing circuit configured to drive the touch sensor and sense a touch or touch coordinates;
   a pad disposed outside a boundary of the encapsulation layer on the substrate; and
   a link line located between the pad and the encapsulation layer, electrically connecting between the touch line and the pad, and formed from a same material as the plurality of data lines,
   wherein an outline portion of the first touch electrode is a flat edge without any protrusion extending from the flat edge to the second touch electrode excepting at least one cutting area removed from a part of the first touch electrode, and
   wherein an outline portion of the second touch electrode a plurality of protrusions extended from an inner mesh shape of the second touch electrode, and at least one protrusion of the plurality of protrusions protruded into a space between at least three protrusions existing in the at least one cutting area of the first touch electrode, and surrounded by the at least three protrusions.

2. The touch display device of claim 1, wherein at least one internal dummy metal is disposed within each of the plurality of mesh type touch electrodes or within at least some of the plurality of mesh type touch electrodes.

3. The touch display device of claim 1, further comprising:
   a protective layer on the link line and plurality of data lines,
   wherein the touch line is connected to the link line through a contact hole in the protective layer.

4. The touch display device of claim 1,
   wherein each of the plurality of mesh type touch electrodes includes a plurality of open areas, and
   wherein each of the plurality of open areas corresponds to a light-emitting region of at least one sub-pixel among the plurality of sub-pixels.

5. The touch display device of claim 1, further comprising:
- an organic light emitting diode disposed on the plurality of data lines and the plurality of gate lines and including a first electrode, a light emitting layer on the first electrode, and a second electrode on the light emitting layer,
- wherein the encapsulation layer is on the second electrode.

6. The touch display device of claim 1, wherein the touch-sensing circuit is configured to apply a driving signal to one of the first touch electrode and the second touch electrode and to receive a sensing signal from a remaining one of the first touch electrode and the second touch electrode.

7. The touch display device of claim 1, wherein portions of the outline portion of the first touch electrode and portions of the outline portion of the second touch electrode surround each other in an interlocking puzzle piece manner.

8. The touch display device of claim 1, wherein portions of the outline portion of the first touch electrode and portions of the outline portion of the second touch electrode form a zipper pattern configured to increase mutual capacitance between the first and second touch electrodes.

9. The touch display device of claim 1, further comprising:
- a plurality of color filters disposed on the substrate and located at positions corresponding to respective positions of open areas included in at least one of the plurality of mesh type touch electrodes.

* * * * *